US008635156B2

(12) United States Patent
Oskolkov et al.

(10) Patent No.: US 8,635,156 B2
(45) Date of Patent: Jan. 21, 2014

(54) CONVERTING PAPER INVOICE TO ELECTRONIC FORM FOR PROCESSING OF ELECTRONIC PAYMENT THEREOF

(75) Inventors: Ilya Oskolkov, Moscow (RU); Rodion Shishkov, St. Petersburg (RU)

(73) Assignee: Rawllin International Inc., Tortola (VG)

( * ) Notice: Subject to any disclaimer, the term of this patent is extended or adjusted under 35 U.S.C. 154(b) by 44 days.

(21) Appl. No.: 13/226,177

(22) Filed: Sep. 6, 2011

(65) Prior Publication Data

US 2013/0060684 A1    Mar. 7, 2013

(51) Int. Cl.
*G06Q 40/00* (2012.01)
(52) U.S. Cl.
USPC ............................................. 705/40; 705/35
(58) Field of Classification Search
USPC ..................................................... 705/35–40
See application file for complete search history.

(56) References Cited

U.S. PATENT DOCUMENTS

| 7,575,171 B2 | 8/2009 | Lev |
| 2005/0033690 A1* | 2/2005 | Antognini et al. ............... 705/40 |
| 2008/0313062 A1 | 12/2008 | Williams |

FOREIGN PATENT DOCUMENTS

| EP | 1587014 A1 | 10/2005 |
| EP | 0960402 B1 | 9/2007 |

* cited by examiner

*Primary Examiner* — Thu Thao Havan
(74) *Attorney, Agent, or Firm* — Turocy & Watson, LLP

(57) ABSTRACT

Systems, apparatuses and methods are described for remotely processing paper invoices online. In an aspect, a method comprises receiving by a computing device, an electronic image representative of an invoice associated with a user of the device and a payee, sending the electronic image of the invoice to an online accounting system, wherein the online accounting system converts the electronic image of the invoice into an electronic form, accessing accounts associated with the user of the device, accessing the electronic form of the invoice, and authorizing payment of the invoice, including authorizing electronic transfer of money from at least one of the accounts to the payee. The method can further include receiving a list of payees, selecting the payee from the list of payees, and sending the selection of the payee to the online accounting system, wherein the online accounting system links the payee to the invoice.

50 Claims, 15 Drawing Sheets

CONVERTING PAPER INVOICE TO ELECTRONIC FORM FOR PROCESSING OF ELECTRONIC PAYMENT THEREOF

TECHNICAL FIELD

This disclosure relates generally to facilitating electronic money transfer including remote payment of paper invoices via an electronic money transfer service.

BACKGROUND

Rather than receiving paper bills, many individuals have begun to pay their bills online. For example, companies generally provide customers an option to pay their bills online at a website set up by the company or an affiliated billing service provider. Paying bills online facilitates efficient money transfer from any location, eliminates paper waste and physical mailing restrictions, eliminates manual processing, enables automatic payments, and provides accessible electronic billing records. However, many small organizations are not capable of generating electronic invoices and therefore continue to print and send paper invoices to clients.

Given the general shift towards paying bills online, it is inconvenient for those consumers who are paying their bills online to receive paper bills. With paper bills, the individual loses the many advantages of online billing. For example, the consumer loses the advantage of keeping a single electronic accounting system for all bills. Now the individual must resort to storing paper records of bills. Further, the consumer must employ conventional mailing systems including postage requirements and billing delays.

The above-described deficiencies of paper billing systems are merely intended to provide an overview of some of problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject disclosure. Its sole purpose is to present some concepts of the disclosed subject matter in a simplified form as a prelude to the more detailed description presented later.

To correct for the above noted deficiencies of conventional billing techniques and other drawbacks of offline invoicing technologies, methods, and apparatus described employ dynamic product context data and/or social activity data related to the product to generate product recommendations. For example, a device is provided comprising a memory that stores computer-executable components, including an invoice image component configured to receive an electronic image representative of an invoice associated with a user of the device and a payee, a communication component configured to send the electronic image of the invoice to an external accounting system, wherein the external accounting system converts the electronic image of the invoice into an electronic form, an account management component configured to access accounts associated with the user of the device and further configured to access the electronic form of the invoice, a transaction component configured to authorize payment of the invoice, including authorizing electronic transfer of money from at least one of the accounts to the payee, and a processor that facilitates execution of at least one of the invoice image component, the communication component, the account management component, or the transaction component. In an aspect, the device can include a payee component configured to receive a list of payees and send a selection of the payee from the list of payees to the external accounting system, wherein the external accounting system is configured to link the payee to the invoice.

In another aspect, provided is a system comprising a memory that stores computer-executable components, including a registration component configured to register a device associated with a user of an online accounting system, a data storage configured to store information regarding accounts associated with the user, an invoice image component configured to receive from the device, an electronic image representative of an invoice associated with the user and a payee, a conversion component configured to convert the electronic image of the invoice into an electronic form, an account management component configured to post the electronic form of the invoice to the online accounting system and provide the user access to the electronic form of the invoice, a transaction component configured to process payment of the invoice, including transfer of money from at least one of the accounts to the payee, and a processor that facilitates execution of at least one of the registration component, the invoice image component, the communication component, the account management component, or the transaction component. In an aspect, the system further comprise a payee component configured to provide a list of payees to the device, receive a selection of the payee from the list of payees, and link the payee to the invoice.

In addition, provided is a method comprising receiving by a computing device, an electronic image representative of an invoice associated with a user of the device and a payee, sending the electronic image of the invoice to an online accounting system, wherein the online accounting system converts the electronic image of the invoice into an electronic form, accessing accounts associated with the user of the device, accessing the electronic form of the invoice, and authorizing payment of the invoice, including authorizing electronic transfer of money from at least one of the accounts to the payee. The method can further include receiving a list of payees, selecting the payee from the list of payees, and sending the selection of the payee to the online accounting system, wherein the online accounting system links the payee to the invoice.

Further, provided is a method comprising registering a computing device associated with a user of an online accounting system with the online accounting system, storing information regarding accounts associated with the user, receiving from the computing device, an electronic image representative of an invoice associated with the user and a payee, converting the electronic image of the invoice into an electronic form, posting the electronic form of the invoice to the online accounting system, providing the user access to the electronic form of the invoice, and processing payment of the invoice, including transferring money from at least one of the accounts to the payee.

A system is also provided comprising means for receiving by a computing device, an electronic image representative of an invoice associated with a user of the device and a payee, means for sending the electronic image of the invoice to an online accounting system, wherein the online accounting system converts the electronic image of the invoice into an electronic form, means for accessing accounts associated with the user of the device, means for accessing the electronic form of the invoice, and means for authorizing payment of the invoice, including authorizing electronic transfer of money from at least one of the accounts to the payee.

In another aspect, a system is provided comprising means for registering a computing device associated with a user of an online accounting system with the online accounting system, means for storing information regarding accounts associated with the user, means for receiving from the computing device, an electronic image representative of an invoice associated with the user and a payee, means for converting the electronic image of the invoice into an electronic form, means for posting the electronic form of the invoice to the online accounting system, means for providing the user access to the electronic form of the invoice, and means for processing payment of the invoice, including transferring money from at least one of the accounts to the payee.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
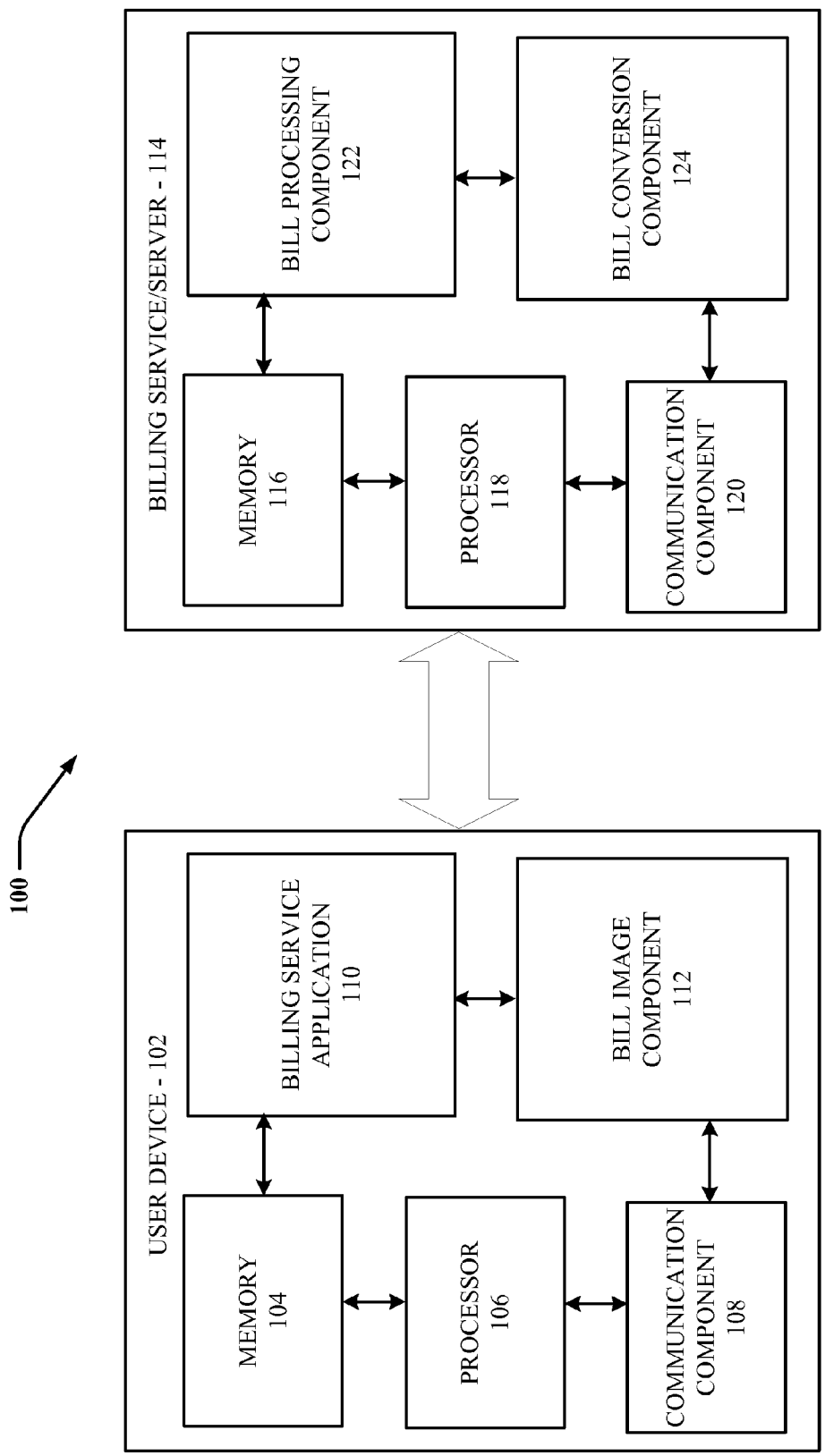
FIG. 1 illustrates a block diagram of a remote money transfer system 100, in accordance with an embodiment.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

Referring now to FIG. 1, illustrated is a block diagram of a remote money transfer system 100, in accordance with an embodiment. Aspects of money transfer system 100, and systems, other apparatus, and processes explained herein can constitute machine-executable instructions embodied within machine(s), e.g., embodied in one or more computer readable mediums (or media) associated with one or more machines. Such instructions, when executed by the one or more machines, e.g., computer(s), computing device(s), virtual machine(s), etc. can cause the machine(s) to perform the operations described.

As seen in FIG. 1, money transfer system 100 includes a user device 102 and a billing service/server 114. As used herein a "user" includes an individual associated with a client device who uses at least one feature of the billing service 114. A user device 102 can include a mobile device or a stationary device. For example, in an aspect, user device 102 can be a device such as a cellular telephone, a PDA with mobile communications capabilities, and messaging-centric devices. In another aspect, user device 102 can include a home personal computer (PC). Billing service/server can include one or more computers, applications, or systems configured to implement a billing protocol that facilitates electronic transfer of money between entities.

As seen in FIG. 1, user device 102 can include a memory 104, a processor 106, a communication component 108, a billing service application 110, and a bill image component 112. Memory 104 holds instructions for carrying out the operations of the communication component 108, billing service application 110, and bill image component 112, when executed by processor 606. The processor facilitates controlling and processing all onboard operations and functions of the user device 102. Memory 104 interfaces to the processor 106 for storage of data and one or more applications of the user device. The applications can be stored in the memory 104 and/or in a firmware, and executed by the processor 106 from either or both the memory 104 or/and the firmware (not shown).

Bill image component 112 is configured to generate an image of a bill or invoice. For example, in an aspect bill image component 112 can include a camera. According to this aspect, a user can employ the camera to take a snapshot of a paper bill. In another aspect, bill image component 112 can include a scanner and/or drivers and software associated with an external scanner. According to this aspect, a user can scan a copy of a paper bill and receive the scanned image at the user device 102. In an aspect the user device can include a display screen, (not shown) for displaying images of bills that are generated either via a camera or a scanner. According to this aspect a user can physically determine whether the image of the bill produced by the bill image component 112 is discernible (e.g., clear, not blurry or skewed). Still in yet another aspect, bill image component 112 can be configured to receive an image of a bill as a communicated message. For example, the bill image component 112 can retrieve a picture of a bill received as an email attachment or received as an attachment sent via a multimedia message service.

Communication component 108 is configured to enable communication of information to and from user device 102. In an embodiment, communication component 108 is configured to send an image of a bill to billing service/server 114. Communication component 108 interfaces to the processor 106 to facilitate wired/wireless communication with external systems, e.g., cellular networks, VoIP networks, and so on. The communication component 108 can also include a suitable cellular transceiver (e.g., a GSM transceiver) and an unlicensed transceiver (e.g., WiFi, WiMax) for corresponding signal communications. The communication component 108 also facilitates communications reception from terrestrial radio networks (e.g., broadcast), digital satellite radio networks, and Internet-based radio services networks.

Billing service application 110 can include one or more components that facilitate processing of images of bills captured by bill imaging component 112. In an aspect, the billing service application 110 is supported by external billing service/server 114. The features of billing service/server 114 and billing service application 110 are described in detail supra. In general, billing service application enables a user to perform electronic management of accounts and transfer of money via user device 102. In particular, billing service application 110 enables payment of bills over a wide area network, including bills that are not associated with an electronic form. For example, billing service application 110 enables integration of paper bills into an electronic accounting/billing system through employment of billing service/server 114.

According to an embodiment, billing service application 110 facilitates single point online personal funds management. A user can employ billing service application 110 to create a single account which associates numerous accounts for the user related to transfer of money. For example, accounts can include personal banking accounts, credit accounts, or creditor accounts. In an aspect, a first account and a second account can be different types of accounts, such as a savings account, a checking account, a credit card account, a loan account, or the like. Additionally, the first account and the second account can be associated with different institutions (banks). For example, the first account can be a checking account from Bank of America, while the second account can be a Visa card from Capital One. The account management component 102 can create a single location from which a user can access various accounts with user device 102. Accordingly, the user no longer needs to go to separate websites to access account information, like a website for bank account information and a separate website for credit card information.

In an embodiment, billing service application acts as an electronic wallet that allows a user to affiliate bank accounts, credit accounts, debit accounts, and the like. In an aspect, in order to unify accounts, a user must first register with billing service/server. As described infra, billing service/server can be affiliated with a Unified Charging System so that when the user creates an account with the Unified Charging System and affiliates banking accounts with the Unified Charging System, when the user visits an e-commerce site with a Unified Charging System plug-in, the user can be presented with an option to pay with the Unified Charging System account.

In another example, a user can register with the Unified Charging System and affiliate multiple accounts, such as bank accounts, credit cards, loans, bills, and the like. To affiliate an account, a user can enter required details (account number, provider information, and the like) and sign any required release. After affiliation, the billing service application 110 can allow a user to view an account balance, recent transactions, pay bills, and the like, all in a single place with no manual entrances of transactions. Additionally, the billing service application facilitates transfers of money between accounts. For example, as described infra, with user device 102, a user can employ billing service application 110 to transfer money to an entity providing only a paper bill by linking an image or the paper bill to a unified account.

As noted above, billing service/server 114 can include one or more computers configured to implement a billing protocol that facilitates electronic transfer of money between entities. For example, in an aspect, billing service includes a server computer. The server 114 can include a memory 116, a processor 118, a communication component 120, a bill processing component 122, and a bill conversion component 120. Memory 116 holds instructions for carrying out the operations of the communication component 120, the bill processing component 122, and the bill conversion component 124, when executed by processor 118. The processor facilitates controlling and processing all onboard operations and functions of the server 114. Memory 116 interfaces to the processor 118 for storage of data and one or more applications of the billing server 114. The applications can be stored in the memory 116 and/or in a firmware, and executed by the processor 118 from either or both the memory 116 or/and the firmware (not shown).

Communication component 120 is configured to enable communication of information to and from billing service/server 114. It should be appreciated that communication component 120 is not restricted to a single component. For example, where billing service/server includes multiple computers, each of the computers can include a communications component to facilitate communication between devices integrated within the billing service as well as user devices. In an embodiment, communication component 120 is configured to receive an image of a bill from a user device 102. Communication component 120 interfaces to the processor 118 to facilitate wired/wireless communication with external systems, e.g., cellular networks, VoIP networks, and so on. The communication component 120 can also include a suitable cellular transceiver (e.g., a GSM transceiver) and an unlicensed transceiver (e.g., WiFi, WiMax) for corresponding signal communications. The communication component 120 also facilitates communications reception from terrestrial radio networks (e.g., broadcast), digital satellite radio networks, and Internet-based radio services networks.

According to an embodiment, billing service/server 114 enables electronic transfer of money to and from accounts associated with a user. In an aspect, a user can register with billing service/server. Bill processing component 122 is configured enable electronic transfer of money between entities and user accounts. Bill processing component 122 receives a request to transform money from a first account to a second account where at least the first account is associated with a registered user. In an aspect, the request is associated with a bill. For example a user may desire to pay bills online. According to this aspect, payment of a bill online includes an electronic form of billing as opposed to a paper form of billing. A user can view bills associated with accounts in electronic form, for example using billing service application 110 on her user device. The user can then submit a request for payment or processing of the bill from a designated user account. The bill processing component 122 receives the request and enables transfer of money from the designated user account to the payee (the entity to whom money is owed or paid). In another aspect a user can request recurring payments of online bills.

Bill conversion component 124 is configured to receive an image of a bill and generate an electronic form of the bill. In particular, bill conversion component 124 is configured to receive an image of a bill and create an electronic form of the bill so that a user can manage payment of the paper bill electronically. As noted above, bill conversion component can receive images of bills from a user device taken as a picture or snapshot via a camera, or as a scanned image. In an aspect, bill conversion component 124 interprets aspects of a bill image into fields. For example, bill conversion component can recognize characters of text and interpret the textual characters. According to this aspect, bill conversion component can associate interpreted text with fields. It should be appreciated that bill conversion component can be configured to recognize a variety of fields including but not limited to, item(s) purchased, item number, item quantity, description of the item, unit price, total balance, applicable discounts, sales tax, date of purchase, due date, terms and conditions, method of delivery or pick up, account number, account provider, and payee.

Bill conversion component 124 is further configured to generate an electronic form of a received image bill comprising recognized fields and link the electronic form of the bill to a user. For example, in an aspect bill conversion component 124 is configured to identify a user account associated with a received bill image and associate an electronic form of the bill with a user account. In addition, bill conversion component 124 can be configured to present bill processing component with information gathered by converting the image of the bill into electronic form. The information can be employed by the bill processing component 122 to define fields associated with the converted bill. For example, the bill conversion component can be configured to supply the bill processing component with any of the above noted fields, including but not limited to, item(s) purchased, item number, item quantity, description of the item, unit price, total balance, applicable discounts, sales tax, date of purchase, due date, terms and conditions, method of delivery or pick up, account number, account provider, and payee. Once the bill conversion component 124 converts an image of a bill into electronic form, the bill processing component 122 is configured to link the electronic form of the bill to a user account for processing, recording, or account management.

Figure 2:
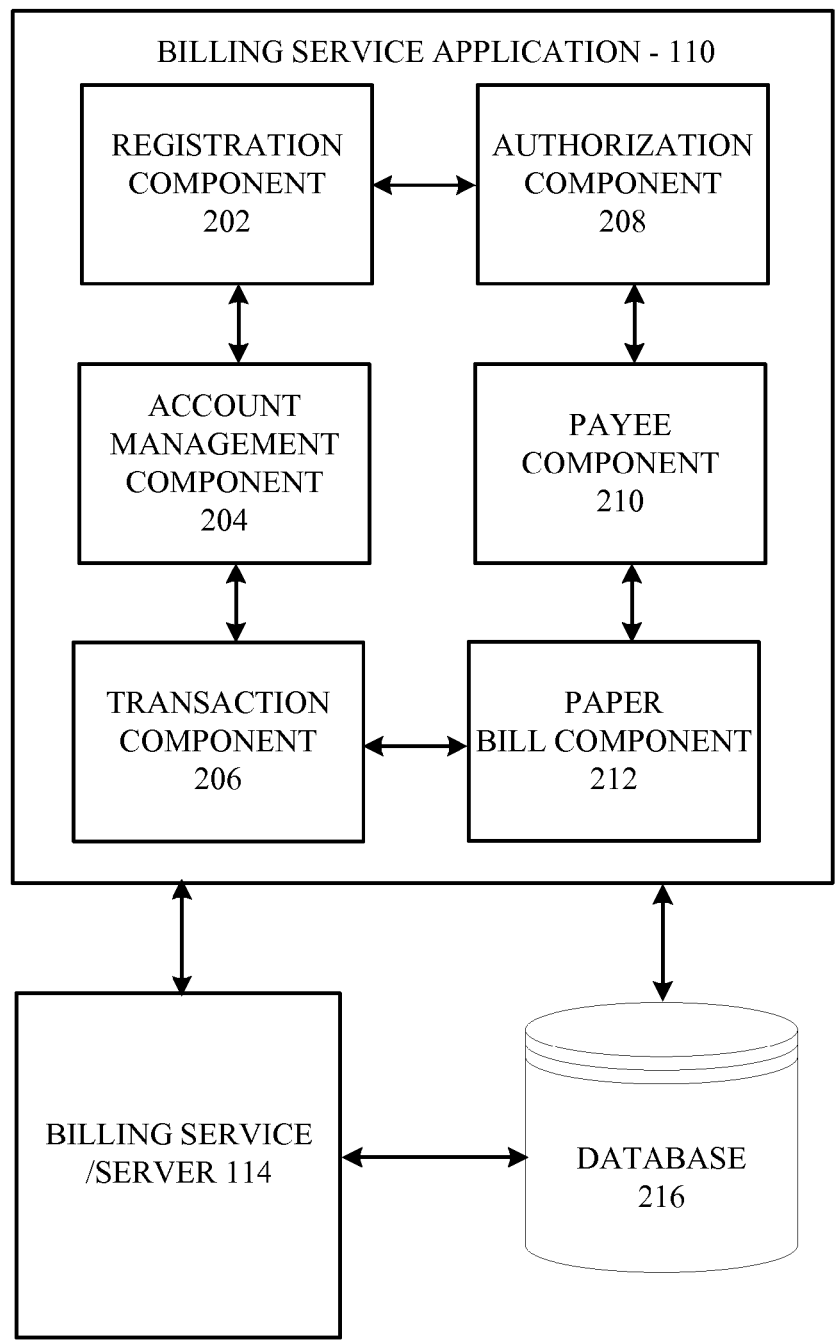
FIG. 2 illustrates a block diagram of a billing service application in accordance with an embodiment.

Referring now to FIG. 2, presented is a schematic block diagram of billing service application 110 of FIG. 1. As seen in FIG. 2, billing service application can include a registration component 202, account management component 204, transaction component 206, authorization component 208, payee component 210, and paper bill component 212. Billing service application 110 is configured to provide a variety of applications to a user associated with electronic accounting. In particular, billing service application 110 enables a user of a remote device to perform electronic money transfers between entities affiliated with the remote device. In addition, billing service application enables a user to unify a variety of accounts so that each account can be accessed and managed from a single website. In an aspect, information regarding the plurality of user accounts is collected, stored, sorted and updated at remote billing service/server 114. In an aspect, billing service/server employs a database 216 to compile and store information regarding accounts and user profiles. Database 216 is depicted as external from billing service application and bill service/server 114, however it should be appreciated that database 216 can be included with bill service/server 114.

According to an embodiment, in order to employ billing service application 110, a user must download the application to a user device. In another aspect, the user device can be preconfigured with the billing service application 110. Once the billing service application 110 is installed on a user device, in an aspect, in order to employ billing service application, a user must register with the billing service/server 114. Registration component 202 is configured to enable user registration with billing service/server 114. In an aspect, in order to register with billing service/server, a user must establish a user profile. At a basic level, in order to establish a profile, a user can create a user name and password. In an aspect, each time a user desires to employ billing service application 110 a user can login through registration component 110 by providing a username and password. In another aspect, registration can associate a user device to a user profile. For example, a user can register his or her device through a variety of identification tags, including a cell phone number, cell ID, or IP address. According to another aspect, registration component 202 can require a user to provide a variety of personal information about a user to supplement a user profile. For example, the user profile can include user identification information, user address, user social security information, driver's license number, etc. User profile information can be employed by authorization component 208 to ensure authorization of user account transactions and user account access.

Account management component 204 is configured to enable a user to link one or more accounts to a user profile. As used herein, an account refers to a record of assets had and debts owed to an entity including another individual, a company, a partnership, or the like. In addition, account management component enables a user to manage all linked accounts from a single online management location. In an aspect a user employ account management component 204 to link personal banking accounts including checking accounts and savings accounts as well as credit accounts from different institutions his or her profile. A user can maintain separate account information and separate accounts for each institution and account type and access each account via billing service application at a single website. According to this aspect, a user can transfer funds between accounts, observe account activity and history, and employ any on the accounts in online transactions and bill pay. In another embodiment, account management component 204 can enable a user to link multiple banking accounts into a Unified Charging System.

In addition to personal banking accounts, account management component 204 can enable a user to link a creditor account to his or her profile. As used herein, a creditor account includes an account associated with an entity to which the user owes or provides money. For example, a creditor account can include a friend, a utility company, a retail store, a loan provider, a school, or a service provider. In an aspect, a user can employ account management component 204 to specify creditor account information and link one or more personal banking accounts to a creditor account for payment of creditors. Bills associated with each linked creditor can be managed and viewed with account management component 204. Accordingly, a user can view account history associated with a creditor account including, activity, due dates, balances, promotions, and etc.

The account management component 204 can have functionality similar to that of an automatic teller machine (ATM). The account management component 204 can display prompts similar to an ATM interface that allows a user to select options including viewing an account balance, viewing recent transactions, paying bills, and the like, but different from an ATM, the account management component 204 allows a user to view each of these options from multiple accounts (e.g., a first account and a second account). The account management component 204 can also allow a user to select an option to transfer money between accounts managed by the account management component 204 (e.g., registered with billing service/server). The account management component 204 can provide further options that facilitate selection of functionalities provided for multiple accounts managed by the account management component 204. In addition, the account management component 204 can enable a user to transfer money between a registered account and a non-registered account.

In another aspect, account management component 204 can be configured to enable a user to specify rules and regulations governing transactions associated with accounts. For example, a user can schedule payments on a routine basis, define a hierarchy of banking accounts to draw from, define parameters for notification of fund levels and transactions, define automatic payment plans, provide authorization for access to accounts or provide parameters for authorization of transactions. It should be appreciated that a variety of types of account management actions and regulations can be employed by account management component 204 in accordance with aspects of the subject disclosure.

Transaction component 206 is configured to enable a user to transfer funds from banking accounts to creditors. In an aspect, when a user desires to transfer funds, a user employs transaction component 206. In an embodiment, a user can employ transaction component when desiring to pay bills. Each time a user desires to pay a bill, a user can request a transaction. Transaction component 206 allows a user to specify what account to draw from and what creditor to send money to. In an aspect, a user can set up automatic requests for transactions by defining conditions for transactions via account management component. For example, a user can request a transaction comprising transferring $50 from account X to entity Y on the first of every month if there are sufficient funds in account X, and if there are insufficient funds in account X, to provide the user with a notification.

Transaction component 206 can perform action related to a first account or the second account and creditor or payee. For example, the transaction component 206 can enable setting up a payment to a first account or a second account to the payee. Payment can be established through an online transaction from a checking account, savings account, or credit card to a payee, such as AT&T. The action can also include setting up a payment that is split between accounts to the payee. For example, a bill can be $100 from AT&T, and $75 can be transferred from a checking account to AT&T, $15 can be transferred from a savings account to AT&T, and $10 can be transferred from a credit card to AT&T. Also, in a similar way, transaction component 206 can facilitate transactions between "friends," "family," "business associates," and the like, who may have accounts at different banks and whose account number may not be known or shared.

Authorization component 208 provides authorization for transactions. For example, although a user may request a transaction, a transaction may not be authorized for a variety of reasons. For example, a user may have insufficient funds to complete the transaction. In another aspect, a user may have specified regulations requiring providing of additional passwords or user information for verifying security of certain transactions. According to this aspect, in order to authorize a transaction, a user may need to provide secure information prior to authorizing a transaction. In another aspect, a user can define different rules for authorization requirements for different types of transactions. For example, a user can specify that a transaction is authorized for immediate processing upon request. In an aspect as discussed supra, a request can include sending of a bill image to billing service/server. Once a user requests a transaction and the transaction is authorized, billing service/server processes the transaction request.

Payee component 210 is configured to enable a user to specify a creditor or payee, to whom they desire to provide money in a transaction. In an aspect, a user can define a list of payee's to associate with their profile and store the list in database 216. For example, the list of payee's can be stored at a user device 102, at the billing service/server 114, or at a remote storage location and made accessible to the user through billing application 110. The database 216 of payee's can include account information for each of the payee's which facilitates transfer of money into an account associated with the payee. For example, the list of payee's can include a name of the payee and a location of the payee. The payee information can further include a unique identifier that associates a user with a payee account. For example, a user may be identified to a service provider by a name, a social security number, an account number assigned by the service provider, or a phone number. It should be appreciated that a variety of identifiers can be employed that are in accordance with the scope of the subject disclosure. Accordingly, when a user completes a transaction, the payee can clearly identify that a particular individual or entity has satisfied his or her monetary obligations.

In an aspect, in order to generate a list of payees and associate billing information for a user thereto, a user can manually enter the payee information and save the information in database 216. After initial registration of a payee, the user can merely select the payee from a saved list when desiring to perform a transaction with the payee. By selecting a specific payee, all information required for processing of payment for a user account associated with the payee is transferred to billing service/server 114. Billing service/server 114 can then process the payment.

In another aspect, payee component 210 can allow a user to enter or select a new payee not previously associated with a user profile and/or not previously stored in account database 216. According to this aspect, the payee component 210 can allow a user to search for and select a payee to provide payment to. Payee component 210 can utilize a suitable search engine to discover possible payees. The search engine employed can search entities whom have a registered profile stored in database 216 whom may or may not be associated with a particular user as well as entities whom do not have profiles registered with billing service/server 114. In an aspect, the user can employ payee component 210 to enter a type of payee in a search engine. Based on the type of payee, the payee component 210 can display a list of a plurality of payees that satisfy the type. The type can be any quality of a payee, such as a service type, a location, a name, and the like. For example, the type of payee could be "cable provider," and the selection component can display a list including "Time Warner," "Cox," "AT&T," "Verizon," and "DishNetwork." The type can include more than a single type.

A user can employ a second type of search criteria to filter the list further. According to the previous example, a second type can be "Strongsville, Ohio." The list can be filtered to remove "Verizon" and "Cox" from the list because "Verizon" and "Cox" are not cable providers in Strongsville, Ohio. The list would then include "Time Warner," "AT&T," and "DishNetwork." The payee component 210 can then receive a selection of one or more of the plurality of payees. The selection can be based, for example, on services provided to a user. According to the previous example, a user can select "AT&T" from the list because the user receives AT&T U-Verse cable services and owes AT&T a payment for services provided. The type searched by the payee can also be "friend," "family," "business associate," or the like. For example, the payee component 120 can allow a user to enter a name of an individual or entity. The payee component can then find the payee and display a list of possible payees to the user. The user can then select a payee from the list. Still, the payee component 210 can allow a user to search for a payee by any type of keyword.

In an embodiment, a user can select a payee from a generated search list. The user may not know if the payee is correct or whether they have an account with the payee. In an aspect, the payee component can determine whether a user does in fact have an account with a particular payee already in existence. For example, the payee component 210 can verify that phone number 216-223-3798 has an account with cable service X. The payee component 210 can then notify the user that a match was determined and allow the user to import payee account information. Still in yet another aspect, where a match is not determined, the payee component can notify a user that an account does not exist associating a user with a payee. The payee component 210 can then enable a user to set up a new account.

In another aspect, a payee may not need to set up an account with a payee to perform transaction. A user may merely need to know where to send a user the money. According to this aspect, by selecting a payee from a generated list, the payee component can determine payee account information to which the payee desires to have money transferred. Accordingly a user can simply select a payee from a list and transfer money to the payee following selection without the burden of entering account information for the payee. For example, a user can desire to transfer money to Joe Smith. The user can search for Joe Smith and select Joe Smith. By selecting Joe Smith, any necessary information for transferring money to Joe Smith is imported by payee component 210. A user can then employ transaction component 208 to complete a money transfer to Joe Smith. In an aspect, Joe Smith can be added to a list of payees for a user and thus added to a user's profile and stored for later transactions.

In an aspect, the payee can be registered with billing service/server 114 as with the user. According to this aspect the payee can allow a user to import account information to enable a user to transfer money for that payee. For example, once a user finds a payee, by selecting the payee, the user can anonymously import specific account information about the payee necessary for money transfer to the payee. According to this aspect, the payee can authorize payment to a specific account without compromising security of the account. Further, the user is not required to manually input information to associate the payee with the user for transaction purposes. For example, the user can merely select Time Warner Cable from a list searched. If the user has an account with Time Warner Cable, the user can merely identify himself by providing a name, a phone-number, a cell-ID, an IP address, a password, etc. If the user is matched, Time Warner Cable, can allow a user to import account information from a database associated with Time Warner Cable. In an aspect, where Time Warner Cable is registered with billing service/server 114, the database can be database 216.

In another aspect, a payee may not be registered with billing service/server 114. Continuing the above example where Time Warner Cable is not registered, the database from which account information for Time Warner Cable and/or associating Time Warner Cable and a user can be an external database made accessible by Time Warner Cable. Still in yet another aspect, if for example Time Warner Cable did not provide a database with account information for importation, payee component 210 can employ an artificial intelligence or data mining tool in order to retrieve the information for a user. In the above examples and embodiments, a user does not have to manually input payee account information thus making the task of selecting and transferring money to a payee efficient and straightforward to a user.

In yet another aspect where the payee is not registered with billing service/server 114, the user can send a request to the payee requesting account information. According to this aspect, the user can authorize a transaction to the payee. The billing service/server 114 can in turn attempt to process the transaction by requesting account information for the payee. According to this aspect, if the payee provides the billing service/server 114 with account information, the transaction can be performed. As noted below, with this aspect, transactions between entities can be accomplished without requiring registration of payees with billing service/server 114.

It should be appreciated that profile information, account information, account management regulations, payee information, and authorization information can be stored at billing service/server 114 in memory. In another aspect, account information, account management regulations, payee information, and authorization information can be stored at user device 102 in memory 104. Further profile information, account information, account management regulations, payee information, and authorization information can be stored at an external database 216.

Paper bill component 212 is configured to enable billing service application 110 to process paper bills. As noted above, a user device can include a bill image component 112 to enable a device to receive an image of a paper bill. For example, the image of the paper bill can be generated by a camera on a user device or a scanner associated with the user device. In another aspect, the image of the paper bill can be received as an email attachment or an attachment to an MMS message or any other type of electronic message. Paper bill component 212 allows a user to request conversion of a paper bill into an electronic form. In an aspect, a user can employ paper bill component 212 to send an image of a bill to billing service/server. By sending paper bill image, the user can request a variety of actions to be performed by the billing service/server 114. A user can employ account management component 204 or paper bill component 212 to specify and define actions associated with sending bill images.

According to an embodiment, a can request that the billing server/server simply process payment of the bill in response to sending. A user can further request an electronic receipt to be posted to his or her account profile indicating payment of the bill image was processed. In another aspect, the user can request that the image of the bill be converted to electronic form and posted to his or her profile for future payment and management.

In an aspect, a user can employ payee component to 210 to determine the payee of a paper bill image. For example, a user can employ payee component to select a payee or determine a payee prior to sending the bill image to billing service/server 114. Accordingly, a user can indicate to the billing service/server 114 whom the paper bill is associated with. When a user indicates the payee prior to sending the image of the bill to billing service/server 114, the user can authorize actions for processing that have been pre-determined for a particular payee. For example, a user can employ account management component 204 or payee component 210 to associate rules and regulations governing payment processing for a particular payee. The regulations can include routing payment dates and price for example. When the user sends a bill image to billing service/server 114 and also selects a payee for which regulations are associated, the user in effect makes for processing of the bill for the particular payee in accordance with the regulations.

Figure 3:
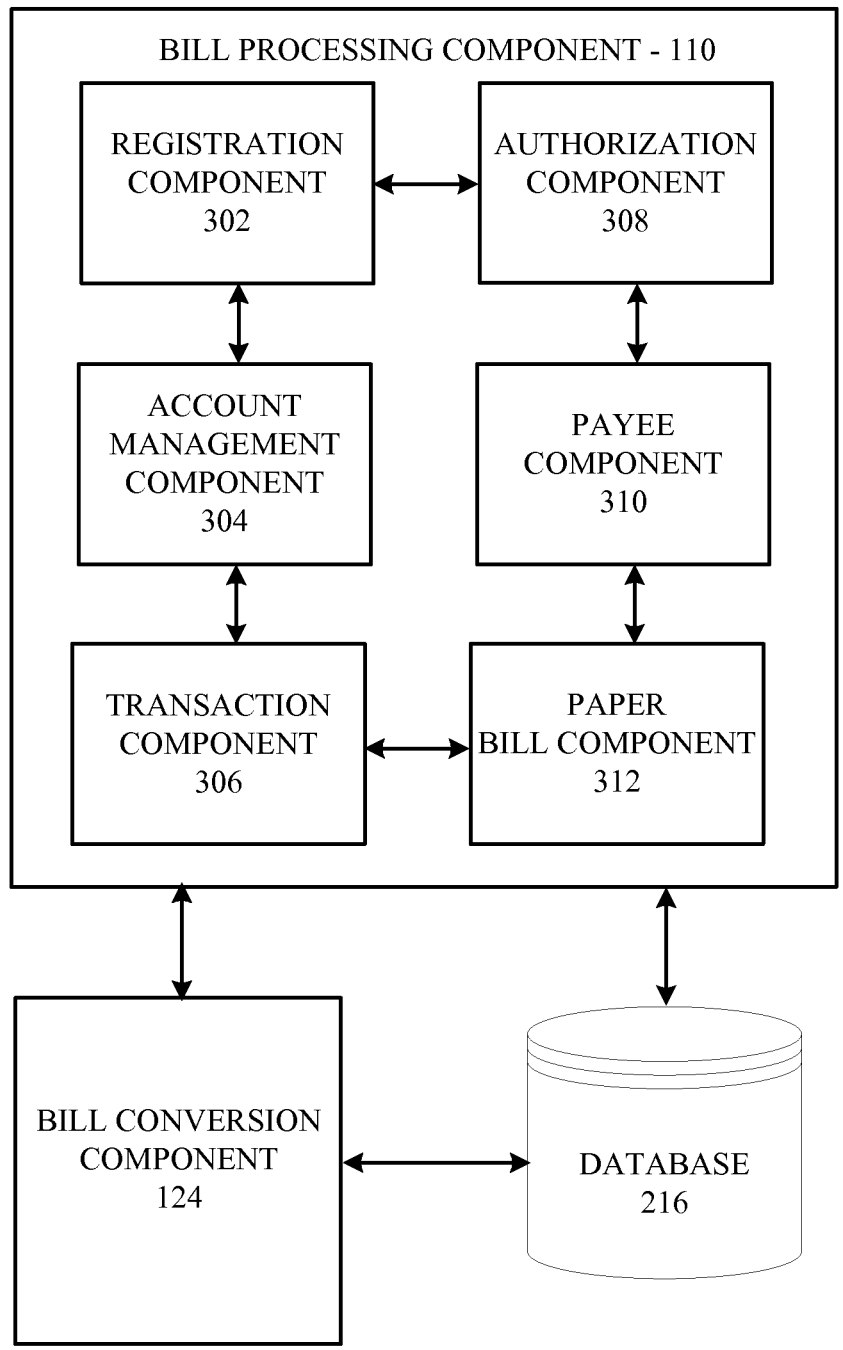
FIG. 3 illustrates a block diagram of a bill processing component of a billing service/server in accordance with an embodiment.

Turning now to FIG. 3, presented is schematic diagram of bill processing component 122. Bill processing component performs one or more of the actions initiated or requested by a user on a user device 102 through billing service application 110. For example, as seen in FIG. 3, in an aspect bill processing component includes reciprocal components as the billing service application, including a registration component 302, an account management component 304, a transaction component 306, an authorization component 308, a payee component 310, and paper bill component 312.

Billing processing component 122 is configured to provide perform the actions related to electronic accounting via the billing service application. In particular, bill processing component actually employs database 216 to perform user registration and authorization, account linking and management, account updating, and electronic money transfers between entities and users. As noted above, database 216 is configured to store information regarding accounts and user profiles. Bill processing component populates database 216 in response to requests through billing service application and employs database 216 to perform the above noted actions.

According to an embodiment, bill processing component supplies billing service application 110 to a user device for downloading. Registration component 302 is configured to request a user to register with billing service/server 114. In an aspect, in order to register with billing service/server, a user must establish a user profile. At a basic level, in order to establish a profile, a user can create a user name and password in response to a request by registration component 302. Accordingly, registration component 302 is configured to receive login information that enables a user to register with and login to, billing service/server. Registration component is configured to record newly created user profiles and login information in database 216.

Account management component 304 is configured to user to link one or more accounts to a user profile and record the association in database 216. For example, a user employ account management component 204 to link personal banking accounts including checking accounts and savings accounts as well as credit accounts from different institutions his or her profile. A user can maintain separate account information and separate accounts for each institution and account type and access each account via billing service application at a single website. In addition to personal banking accounts, account management component 204 can enable a user to link creditor account to his or her profile. In an aspect, a user can employ account management component 204 to specify creditor account information and link one or more personal banking accounts to a creditor account for payment of creditors. Account management component 304 actually performs the linking by associating accounts with user profiles in database 216.

In another aspect, account management component 304 is configured to update data associated with user accounts. For example, account management component 304 is configured to monitor account activity and present the account activity to a user for management. Accordingly, a user can view account history associated with a creditor account including, activity, due dates, balances, promotions, and etc.

In another aspect, account management component 304 can be configured to ensure rules and regulations governing transactions associated with accounts are recorded in database 216, updated, and followed. For example, a user can employ account management component 204 to schedule payments on a routine basis, define a hierarchy of banking accounts to draw from, define parameters for notification of fund levels and transactions, define automatic payment plans, provide authorization for access to accounts or provide parameters for authorization of transactions. It should be appreciated that a variety of types of account management actions and regulations can be employed by account management component 204 in accordance with aspects of the subject disclosure. Account management component 304 monitors transactions and accounts to ensure rules and regulations are followed. In particular, transaction component 306 and account management component 306, work together to perform transactions in accordance with any rules or regulations specified in database 216 for a particular user, account, or payee.

Transaction component 306 is configured to transfer funds from banking accounts to creditors in response to user requests. In an embodiment, a user can employ transaction component 306 when desiring to pay bills. Each time a user desires to pay a bill, a user can request a transaction via transaction component 206. In turn, transaction component 306 executes a transaction by looking up user account information and creditor information and facilitating a secure electronic transfer of funds between the accounts. In an aspect, transaction component 306 retrieves account information stored in database 216. In another aspect, transaction component 306 retrieves account information from entities directly or from external databases.

For example, transaction component 206 allows a user to specify what account to draw from and what creditor to send money to. In an aspect, a user can set up automatic requests for transactions by defining conditions for transactions via account management component. For example, a user can request a transaction comprising transferring $50 from account X to entity Y on the first of every month if there are sufficient funds in account X, and if there are insufficient funds in account X, to provide the user with a notification. Transaction component 306 can perform actions related to a first account or the second account and creditor or payee. For example, the transaction component 206 can enable setting up a payment to a first account or a second account to the payee. Transaction component 306 in turn establishes payment through an online transaction from a checking account, savings account, or credit card to a payee, such as AT&T.

Authorization component 308 works in conjunction with authorization component 208 to authorize transactions. For example, authorization component can look up user information, and database 216 to ensure that a particular transaction is authorized. Although a user may request a transaction, a transaction may not be authorized for a variety of reasons. For example, a user may have insufficient funds to complete the transaction. In another aspect, a user may have specified regulations requiring providing of additional passwords or user information for verifying security of certain transactions. According to this aspect, in order to authorize a transaction, a user may need to provide secure information prior to authorizing a transaction. In another aspect, a user can define different rules for authorization requirements for different types of transactions. For example, a user can specify that a transaction is authorized for immediate processing upon request. In an aspect as discussed supra, a request can include sending of a bill image to billing service/server. Authorization component 308 is therefore configured to determine whether requested transactions are authorized base on information stored in database 216. In addition, authorization component 308 is configured to send a user prompts for additional information in order to authorize a transaction. In turn, the authorization component is configured to receive additional information about a user, and account, or a payee, and authorize a transaction based on the additional information. For example, the authorization component 308 can receive a security code. Once a user requests a transaction and the transaction is authorized, transaction component 304 processes the transaction request.

Payee component 310 is configured to retrieve account information for a specified payee for processing of transactions. For example, a user is able to employ payee component 210 to specify a creditor or payee, to whom they desire to provide money in a transaction. In an aspect, a user can define a list of payee's to associate with their profile and store the list in database 216. Payee component 310 is configured to ensure recording of payees in database 216. Payee component 310 is further configured to retrieve payee information in response to a request for a transaction between a user and a specified payee.

In another aspect, payee component 310 is configured to populate database 216 with account information for a payee. According to this aspect, a user can employ payee component 210 to determine the identity of a payee. For example, a user could employ payee component 210 to search for a particular payee. In an aspect, the payee is a medium sized lumber distribution company named Lumberdownunder. A user can simply select Lumberdownunder as the payee for a transaction request and submit the request to billing service/server. The user need not determine any account information for Lumberdownunder because according to this aspect, payee component 310 determines the account information. In an aspect, payee component can search database 216 to determine whether Lumberdownunder is a registered user with provided account information. If Lumberdownunder does in fact provide account information for bill pay, the payee component 310 employs the recorded information for use in a transaction request. In another aspect, if Lumberdownunder does is not a registered user and does not provide account information, payee component can search for account information at external systems to attempt to discover account information. Still in yet another aspect, payee component 310 can contact Lumberdownunder directly for account information either by email, instant messaging, fax, or automated phone calls. The direct contact can further include prompts to join billing service/server and establish a profile to provide access to account information for bill pay.

Paper bill component 312 is configured to receive converted paper bills from bill conversion component 124 for processing. As noted above, a user device can include a bill image component 112 that enables the device to receive an image of a paper bill. For example, the image of the paper bill can be generated by a camera on a user device or a scanner associated with the user device. In another aspect, the image of the paper bill can be received as an email attachment or an attachment to an MMS message or any other type of electronic message. Paper bill component 312 is configured to receive a conversion of a paper bill in an electronic form. Paper bill component is further configured to determine appropriate processing for a converted bill.

In an aspect, paper bill component 312 is configured to retrieve instructions regarding processing or a paper bill in accordance with a user profile and a determined payee. For example, a user can send a bill image with a selected payee associated therewith. In another aspect, bill conversion component 124 can determine a payee at the time of conversion. Upon receipt of the converted bill, paper bill component can instruct transaction component 306 to perform electronic payment of the bill. In another aspect, paper bill component can be configured to update account information for a user by creating electronic data for the user and the particular payee. In turn, the electronic form of the bill can be posted to a user's profile and stored in database 216. According to this aspect, a user can later manage the original paper bill for processing in accordance with existing electronic accounts. In another aspect, paper bill component 312 is configured to create a receipt associated with processing a received converted image of a paper bill. For example, the paper bill component 312 can be configured to establish account information in an electronic form for a user and the particular payee of the paper bill for record keeping purposes.

In view of the example system(s) and apparatuses described above, example method(s) that can be implemented in accordance with the disclosed subject matter can be better appreciated with reference to flowcharts of FIGS. 4-12. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described. It should be further appreciated that the example methods disclosed throughout the subject specification are capable of being stored on an article of manufacture to allow transporting and transferring such methods to computers for execution, and thus implementation, by a processor or for storage in a memory.

Figure 4:
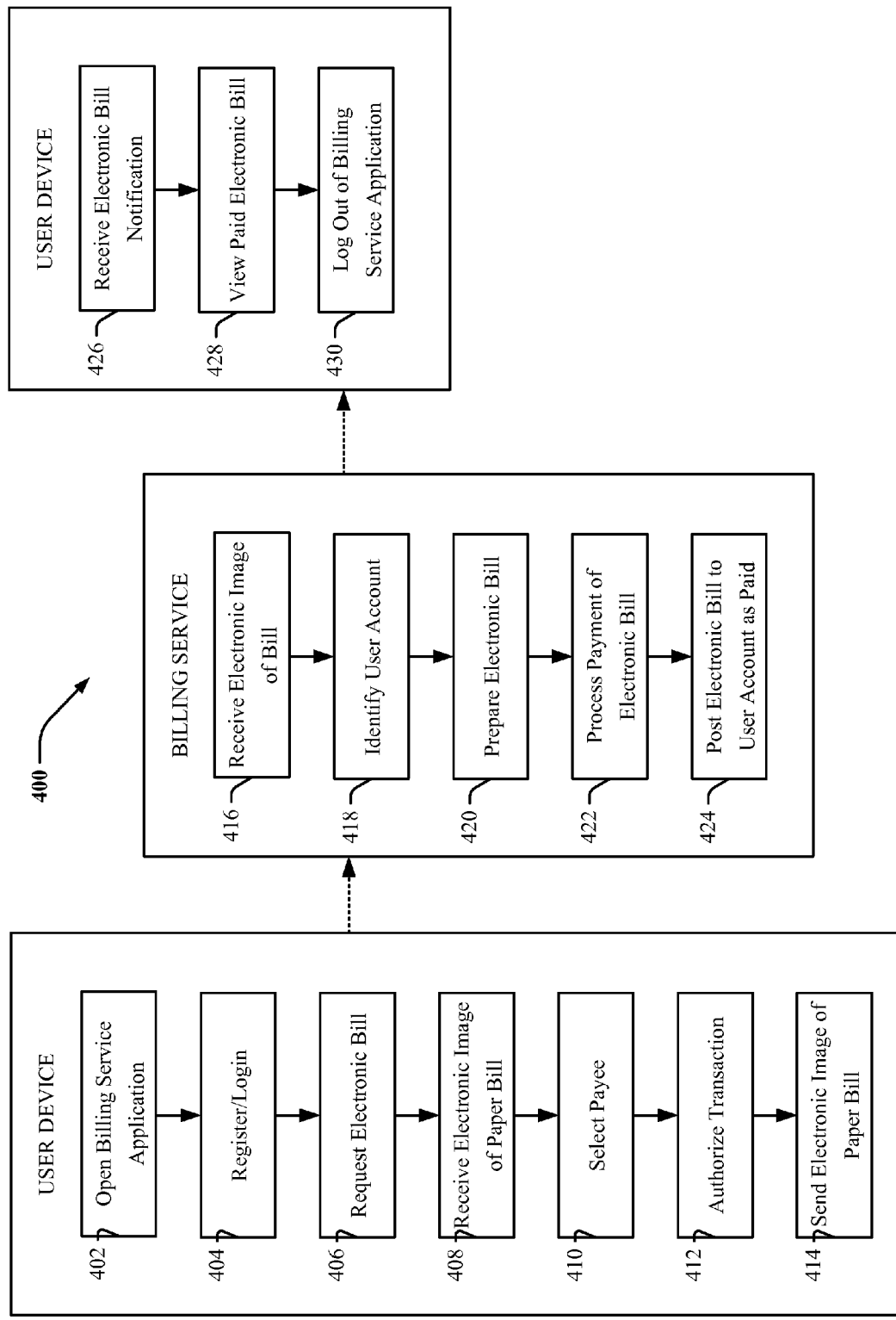
FIG. 4 presents a flow chart of a processes processing payment of a paper invoice in accordance to an embodiment.

FIG. 4 presents a flow chart of a processes 400 processing payment of a paper invoice in accordance with an embodiment. In particular, process 400 demonstrates cooperating processes at both the user device and the billing service. Beginning with the user device at 402 a user can open up billing service application at her user device. For example, the user can have previously installed billing service application at her user device. At 404, the user can register with the billing service if not previously registered. For example, the user can develop a profile consisting of a user name and password and basic information regarding the user. If the user has already established a profile, the user can merely enter her user name and password at step 404. Still in yet another aspect, a user and authorize automatic login when opening the billing service application at a known device in subsequent sessions. According, to process 400, we can assume a user has previously registered with billing service and established a profile. The profile can associate a plurality of accounts for the user including banking, credit, and creditor accounts for the user.

At 406, the user can then request an electronic bill. For example, a user can request an electronic bill when a user merely has a paper form of a bill. Be requesting an electronic bill at 406, the user can initiate processing of the paper bill in an electronic manner. At 408, an electronic image of the paper bill is received in response to the request. For example, when a user requests an electronic bill, the user can be prompted with a notification to supply an image of the paper bill. The user must then provide an image of the paper bill. In an aspect, the user can employ her user device to take a picture of the paper bill and then upload the picture. In another aspect, the user can receive a picture at her device as an attachment to an email or an MMS message. In another aspect, the user can receive an image of paper bill via a scanner associated with her device.

Once an image of a bill has been received, at 410, the user can then select a payee. Selection of a payee can be accomplished in several ways. In an aspect, a user can manually enter the name and account information of the payee provided on the paper form of the bill. In another aspect, the user can simply employ a preconfigured list of payees associated with a user profile. For example, the user can establish a profile comprising a list of payees and information related to processing payments to the payees. The information can include the payee account number, the user account number from which to transfer funds out of, and at least some identifier linking the user to the payee. Still in yet another aspect, a user can select a payee that is not previously associated with a user profile. In an aspect a user can search for registered payees an employ information previously provided to billing service and stored in a database. In another aspect, a user can search for unregistered payees and attempt to receive account information for processing of payment for the unregistered selected payees. According to this aspect, if a user selects an unregistered payee, the user can authorize a payment to the payee, however whether or not the payment is processed is dependent upon later determination of the payee account information by billing service.

Once a payee is selected, at 412, a user can authorize a transaction. For example, the user can authorize payment of the bill represented by the bill image. In another aspect, the user can authorize scheduled payments of the bill represented by the bill image. However, in order to complete a request for an authorized transaction, at 414 the user must send the electronic image of the paper bill to the billing service for processing. According to an embodiment, once the user device transmits the electronic bill to the billing service, the user fulfils his payment obligations. In other words, the user submits a payment by sending the image of the bill.

At 416, the billing service receives the electronic bill image. At 418, the billing service identifies a user account/profile. In an aspect, the billing service can identify a user account by the phone number, email address, or IP address associated with the transmission of the bill image. At 420, the billing service prepares an electronic form of the bill. For example, the billing service can convert aspects of the bill image into an electronic form. The conversion can include recognition of necessary fields such as total amount owed and due date. In another aspect, the conversion can identify a plurality of fields including item price, total price, addresses, dates, account numbers etc. The billing service then employs the recognized information to prepare an electronic form of the bill. Still in yet another aspect, preparation of an electronic form of the bill merely includes associating the image of the bill with payee and storing the electronic information. The stored information can further include additional information such as date paid, and payee information gathered by the billing service. The payee information can have been previously provided to and stored by the billing service. In another aspect, the billing service can retrieve payee account information from external sources.

Regardless of the manner and form in which an electronic form of bill image is analyzed, at 422, payment of the electronic bill form is process electronically. In other words, at 422, electronic transfer of money is made to the payee from a user account. When a user has more than one account, in an aspect, billing service is able to determine the appropriate account according to pre-determined parameters associated with a user profile. For example, a user may specify that home related loan payments are to be paid out of account X, or that all payments processed after the 15$^{th}$ of the month are to be processed out of account Y. Still in yet another aspect, a user can associate a particular account with a particular payee.

At 424, after payment has been processed, the electronic form of the bill and/or an electronic receipt associated with the payment of the bill is generated and posted to a user account. According to this aspect, a user does not need to keep the paper records of the paper bill. On the contrary, the user is provided with an electronic record of the bill and account information associated with the bill. The electronic record can further be stored by the billing service and or by the user device.

Returning to the user device at 426, the user device is configured to receive a notification regarding processing of the image of the paper bill as an electronic bill. For example, when the user is logged on to the billing service, the user can receive a visual or audible indication noting that payment was processed. Still, in an aspect where the user is not logged on, the user can receive a visual or audible indication noting that payment was processed. The logged on user can then view the electronic records of the bill represented by the image of the bill at 428. In an aspect, the electronic records include organized generated information regarding the user's account with the payee. In another aspect, the electronic records can include information such as an electronic receipt indicating the date of payment, what was paid, what was paid for, who was paid, and the accounts associated with payment. Still in yet another embodiment, the electronic records can include limited generated information such as the user's account and the payee, the date of payment, and the actually electronic image of the bill paid. Finally, at 430, a user can log out of the billing service application at her device. It should be appreciated that at any time during process 400, a user can log out and log back in to continue process 400 where it was left at the time of logging out.

Figure 5:
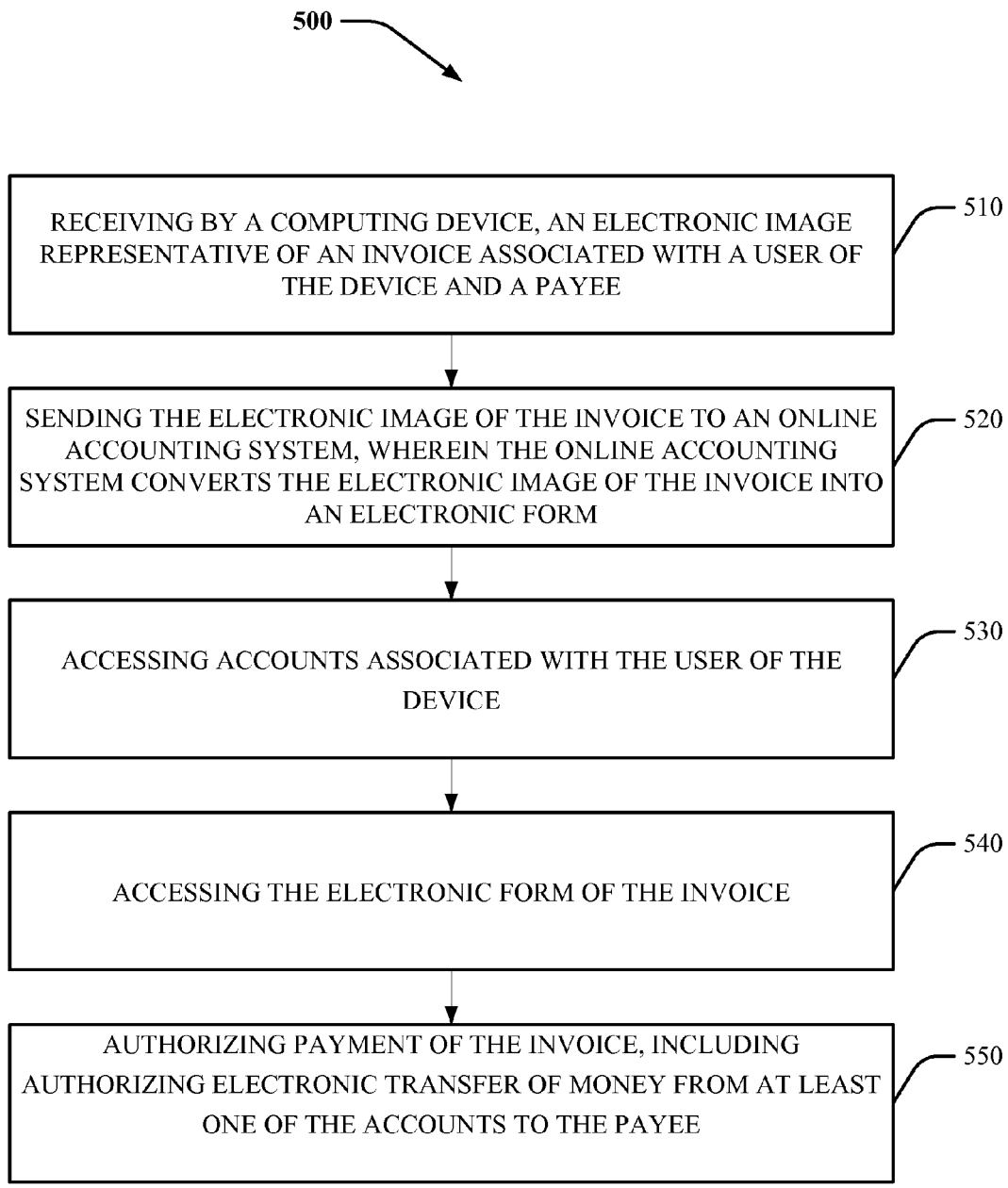
FIG. 5 presents a method for processing a paper bill in an electronic form at a user device in accordance with an embodiment.

FIG. 5 presents a method 500 for processing a paper bill in an electronic form at a user device in accordance with an embodiment. At 510 an electronic image representative of an invoice associated with a user of a computing device and a payee is received at a computing device. For example, the computing device can include a cellular phone with a camera. A user can use the camera to take a picture of a paper invoice and upload the picture to a billing/accounting service application. At 520, the electronic image of the invoice is sent to an online accounting system, wherein the online accounting system converts the electronic image of the invoice into an electronic form. According to an aspect, prior to sending the electronic image of the invoice, a user can select a payee from a list of payees and sent the selection to the accounting system. Accordingly, when the online accounting system receives the electronic image, the accounting system can associate the user, the invoice, and the payee. At 530, accounts associated with the user of the device are accessed. For example, the user can view her accounts by using the online accounting system application on her device. In addition, at 540, the electronic form of the invoice is accessed. Lastly, at 550, payment of the invoice is authorized, including authorizing electronic transfer of money from at least one of the accounts to the payee. In an aspect, the user can authorize payment by sending in the electronic image of the invoice in conjunction with selection of the payee.

Figure 6:
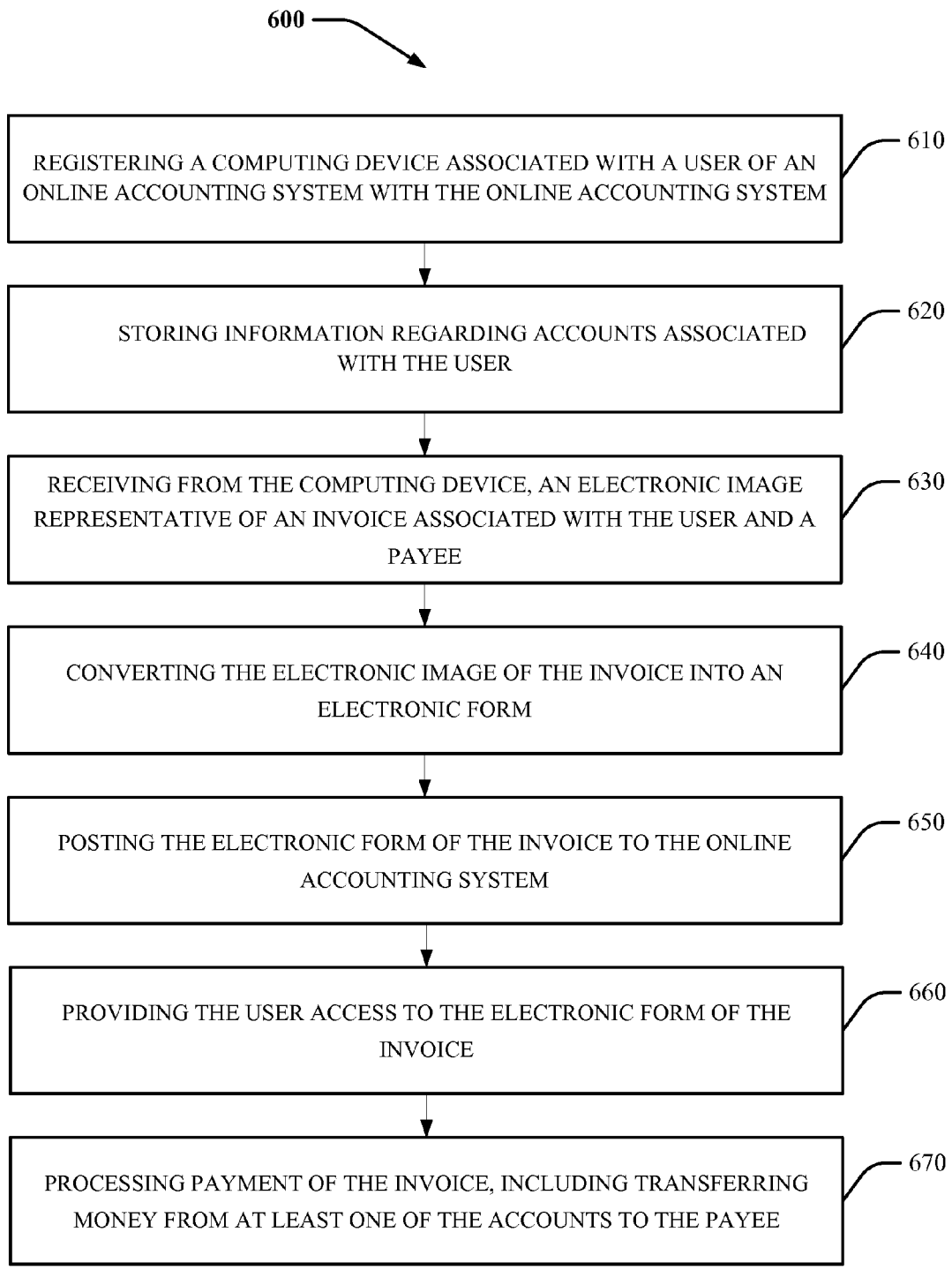
FIG. 6 presents a method for processing a paper bill in an electronic form at a billing service/server in accordance with an embodiment.

FIG. 6 presents a method 600 for processing a paper bill in an electronic form at a server/billing service in accordance with an embodiment. At 610 a computing device associated with a user of an online accounting system is registered with the online accounting system. At 620, information regarding accounts associated with the user is stored. For example, the accounting server/service can store a plurality of banking accounts, credit accounts and creditor accounts for a user. The information can include account numbers, account balances, and account activity. At 630, an electronic image representative of an invoice associated with the user and a payee is received from the computing device. At 640, the electronic image of the invoice is converted into an electronic form. At 650, the electronic form of the invoice is posted to the online accounting system. At 660, the user is provided access to the electronic form of the invoice, and at 670, payment of the invoice is processed, including transferring money from at least one of the accounts to the payee. For example payment of the invoice can be processed in response to a request by the user/user device. In an aspect, the request includes simply receiving the electronic image of the paper invoice.

Figure 7:
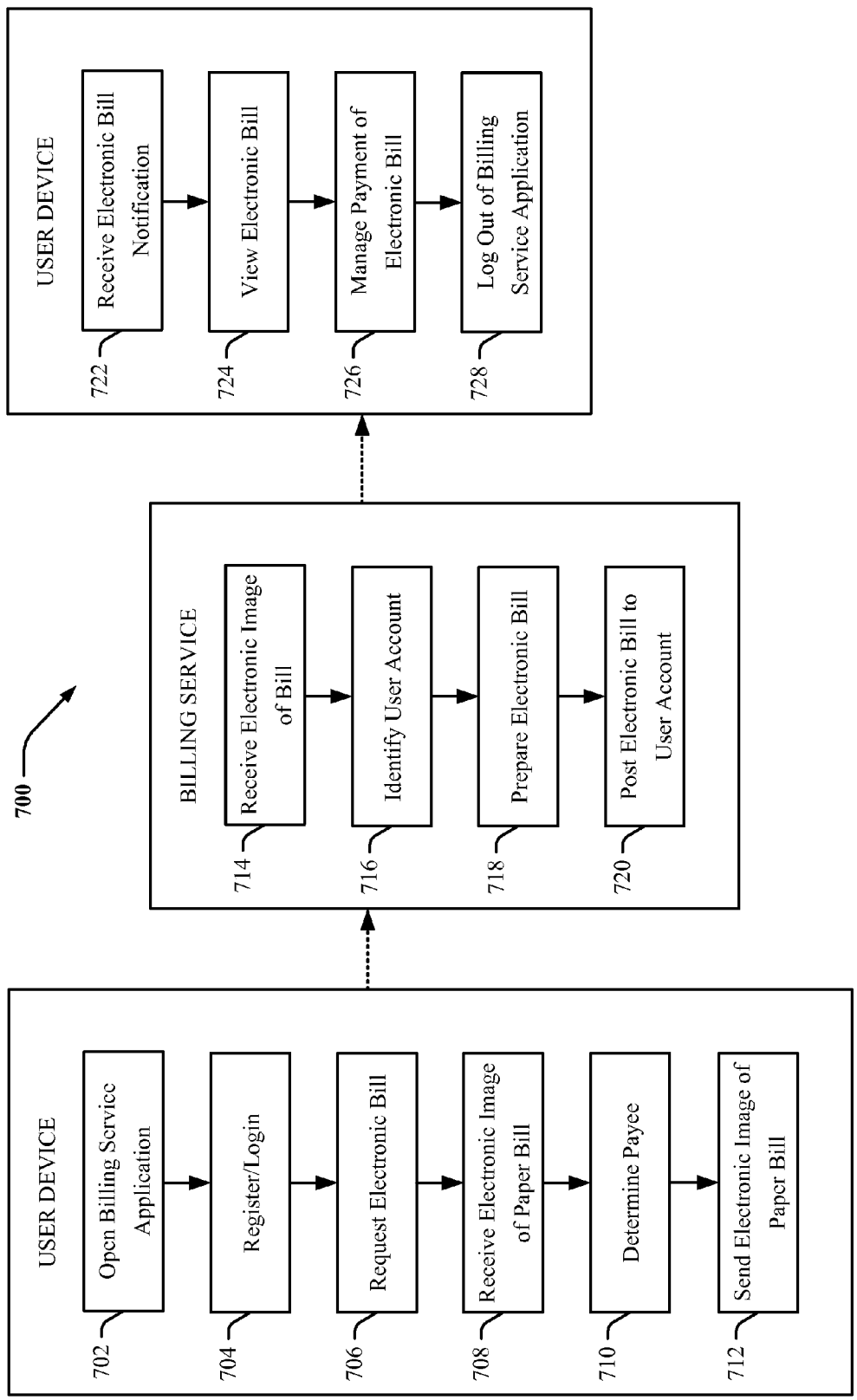
FIG. 7 presents a flow chart of a processes processing payment of a paper invoice in accordance to an embodiment.

FIG. 7 presents a flow chart of a processes 700 processing payment of a paper invoice in accordance with an embodiment. In particular, process 700 demonstrates cooperating processes at both the user device and the billing service. Beginning with the user device at 702 a user can open up billing service application at her user device. For example, the user can have previously installed billing service application at her user device. At 704, the user can register with the billing service if not previously registered. For example, the user can develop a profile consisting of a user name and password and basic information regarding the user. If the user has already established a profile, the user can merely enter her user name and password at step 704. Still in yet another aspect, a user and authorize automatic login when opening the billing service application at a known device in subsequent sessions. According, to process 700, we can assume a user has previously registered with billing service and established a profile. The profile can associate a plurality of accounts for the user including banking, credit, and creditor accounts for the user.

At 706, the user can then request an electronic bill. For example, a user can request an electronic bill when a user merely has a paper form of a bill. Be requesting an electronic bill at 706, the user can initiate processing of the paper bill in an electronic manner. At 708, an electronic image of the paper bill is received in response to the request. For example, when a user requests an electronic bill, the user can be prompted with a notification to supply an image of the paper bill. The user must then provide an image of the paper bill. In an aspect, the user can employ her user device to take a picture of the paper bill and then upload the picture. In another aspect, the user can receive a picture at her device as an attachment to an email or an MMS message. In another aspect, the user can receive an image of paper bill via a scanner associated with her device.

Once an image of a bill has been received, at 710, the user can then determine a payee. Selection of a payee can be accomplished in several ways. In an aspect, a user can manually enter the name and account information of the payee provided on the paper form of the bill. In another aspect, the user can simply employ a preconfigured list of payees associated with a user profile. For example, the user can establish a profile comprising a list of payees and information related to processing payments to the payees. The information can include the payee account number, the user account number from which to transfer funds out of, and at least some identifier linking the user to the payee. Still in yet another aspect, a user can select a payee that is not previously associated with a user profile. In an aspect a user can search for registered payees and employ information previously provided to billing service and stored in an information database. According to this aspect, billing service can import account information for the payee in order to process the transaction. Therefore, account information about a payee is not required to by viewed, known to a user. In another aspect, a user can search for unregistered payees and attempt to receive account information for processing of payment for the unregistered selected payees. According to this aspect, if a user selects an unregistered payee, the user can authorize a payment to the payee, however whether or not the payment is processed dependent upon billing service to later determine the payee account information. Once a payee is selected, at 712 the user can send the electronic image of the paper bill to the billing service for processing.

At 714, the billing service receives the electronic bill image. At 716, the billing service identifies a user account/profile. In an aspect, the billing service can identify a user account by the phone number, email address, or IP address associated with the transmission of the bill image. At 718, the billing service prepares an electronic form of the bill. For example, the billing service can convert aspects of the bill image into an electronic form. The conversion can include recognition of necessary fields such as total amount owed and due date. In another aspect, the conversion can identify a plurality of fields including item price, total price, addresses, dates, account numbers etc. The billing service then employs the recognized information to prepare an electronic form of the bill. Still in yet another aspect, preparation of an electronic form of the bill merely includes associating the image of the bill with payee and storing the electronic information. The stored information can further include additional information such as date paid, and payee information gathered by the billing service. The payee information can have been previously provided to and stored by the billing service. In another aspect, the billing service can retrieve payee account information from external sources.

As noted supra, the payee is determined by the user prior to sending the electronic image of the bill to billing service. In an aspect, the notation of the payee is included in a message when sending the image of the bill to the billing service. In another aspect, the notation of the payee for a particular bill image is associated with the user's account. For example, a notation of an electronic bill request, the time sent and the payee for which it was sent can be stored in database 216 and associated with a user account. Accordingly, the billing service can be provided with the proper identity of a payee as well as the user for which a bill image is submitted and employ the information to generate an electronic form of the bill.

At 720, the electronic form of the bill and/or an electronic receipt associated with the payment of the bill is generated and posted to a user account. According to this aspect, a user does not need to keep the paper records of the paper bill. On the contrary, the user is provided with an electronic record of the bill and account information associated with the bill. The electronic record can further be stored by the billing service and or by the user device.

Returning to the user device at 722, the user device is configured to receive a notification regarding processing of the image of the paper bill as an electronic bill. For example, when the user is logged on to the billing service, the user can receive a visual or audible indication noting that payment was processed. Still, in an aspect where the user is not logged on, the user can receive a visual or audible indication noting that payment was processed. The logged on user can then view the electronic records of the bill represented by the image of the bill at 724. In an aspect, the electronic records include organized generated information regarding the user's account with the payee. For example, the electronic bill can provide a user with all functionality required to pay the bill online. In an aspect, the electronic form of the bill includes fields such as payee, amount owed, date and etc. The electronic form of the bill can further associate the user banking account with the account to which money is to be transferred to a payee. In an aspect, account information for either or both entities can be disguised. At 726, the user can manage electronic payment of the bill. For example, the user can choose to pay the bill and thus authorize a transaction or transfer of funds to the payee. The user can schedule routine payments, modify payment amounts, modify user account information, modify payee account information, and etc. Finally, at 728, the user can log out of the billing service application at her device. It should be appreciated that at any time during process 700, a user can log out and log back in to continue process 700 where it was left at the time of logging out.

Figure 8:
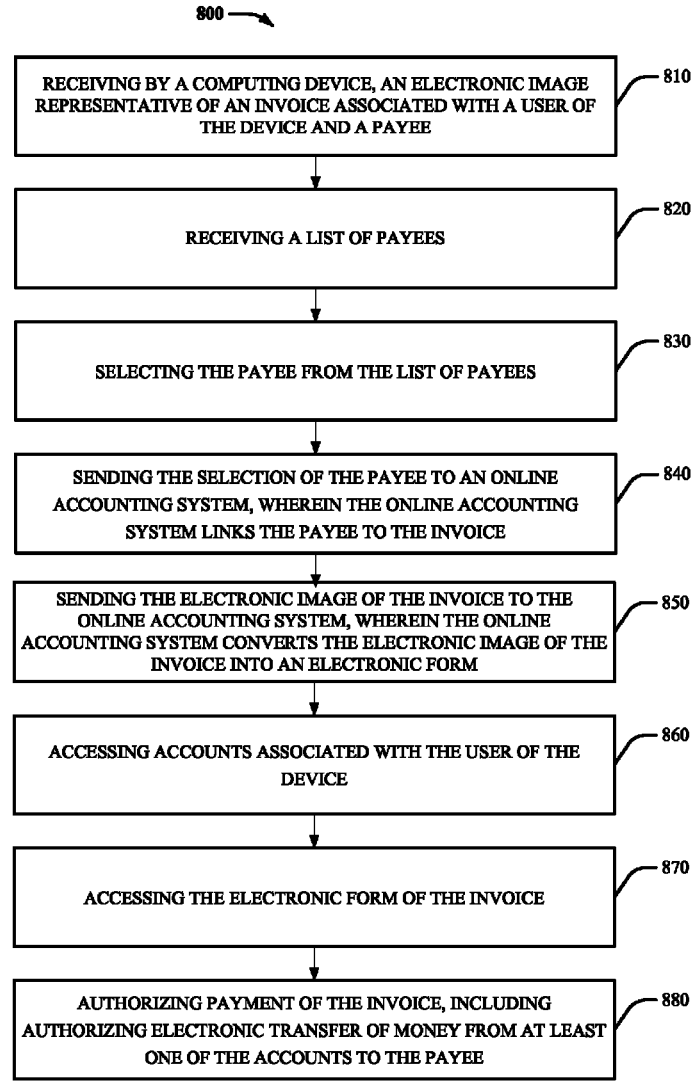
FIG. 8 presents a method for processing a paper bill in an electronic form at a user device in accordance with an embodiment.

FIG. 8 presents a method 800 for processing a paper bill in an electronic form at a user device in accordance with an embodiment. At 810 an electronic image representative of an invoice associated with a user of a computing device and a payee is received at a computing device. For example, the computing device can include a cellular phone with a camera. A user can use the camera to take a picture of a paper invoice and upload the picture to a billing/accounting service application. At 820, a list of payees is received. For example, a user can access a list of payees generated through a searching mechanism, or view a list of payees from a drop down menu. At 840, the user can select a payee from the list of payees. For example, the user can select the payee that is pictured on the electronic image of the invoice or for whom the paper invoice is associated. At 840, the user can send the selection of the payee to an online accounting system wherein the online accounting system links the payee to the invoice. At 850, the electronic image of the invoice is sent to the online accounting system, wherein the online accounting system converts the electronic image of the invoice into an electronic form. At 860, accounts associated with the user of the device are accessed. For example, the user can view her accounts by using the online accounting system application on her device. In addition, at 870, the electronic form of the invoice is accessed. Lastly, at 880, payment of the invoice is authorized, including authorizing electronic transfer of money from at least one of the accounts to the payee.

Figure 9:
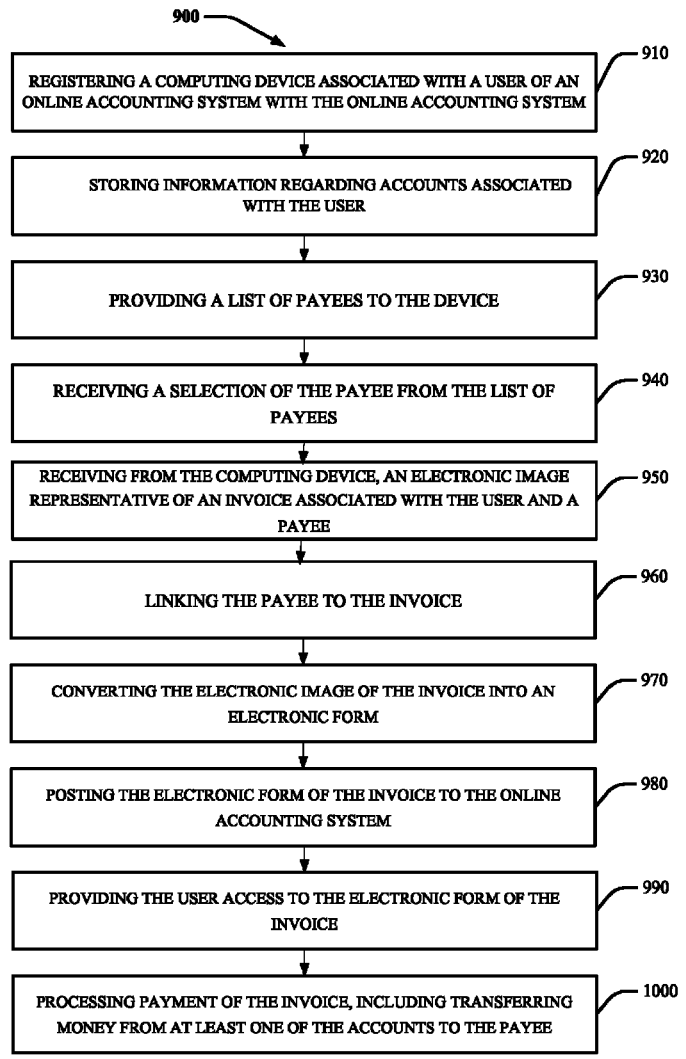
FIG. 9 presents a method for processing a paper bill in an electronic form at a billing service/server in accordance with an embodiment.

FIG. 9 presents a method 900 for processing a paper bill in an electronic form at a server/billing service in accordance with an embodiment. At 910 a computing device associated with a user of an online accounting system is registered with the online accounting system. At 920, information regarding accounts associated with the user is stored. For example, the accounting server/service can store a plurality of banking accounts, credit accounts and creditor accounts for a user. The information can include account numbers, account balances, and account activity. At 930, a list of payees is provided to the device. For example, the device can view a dropdown list of possible payees to select for processing of a transaction associated with paying the invoice. At 940, the selection of a payee is from the list is received. At 940, an electronic image representative of an invoice associated with the user and the payee is received. At 950, the online accounting system links the payee to the invoice. For example, the online accounting system can determine the sender of the payee information and link the payee information to the senders account. In an aspect, the online accounting system can link the payee to the invoice by associate the payee with the invoice when received at substantially the same time.

At 960, an electronic image representative of an invoice associated with the user and a payee is received from the computing device. At 970, the electronic image of the invoice is converted into an electronic form. At 980, the electronic form of the invoice is posted to the online accounting system. At 990, the user is provided access to the electronic form of the invoice, and at 1000, payment of the invoice is processed, including transferring money from at least one of the accounts to the payee. For example payment of the invoice can be processed in response to a request by the user/user device.

Figure 10:
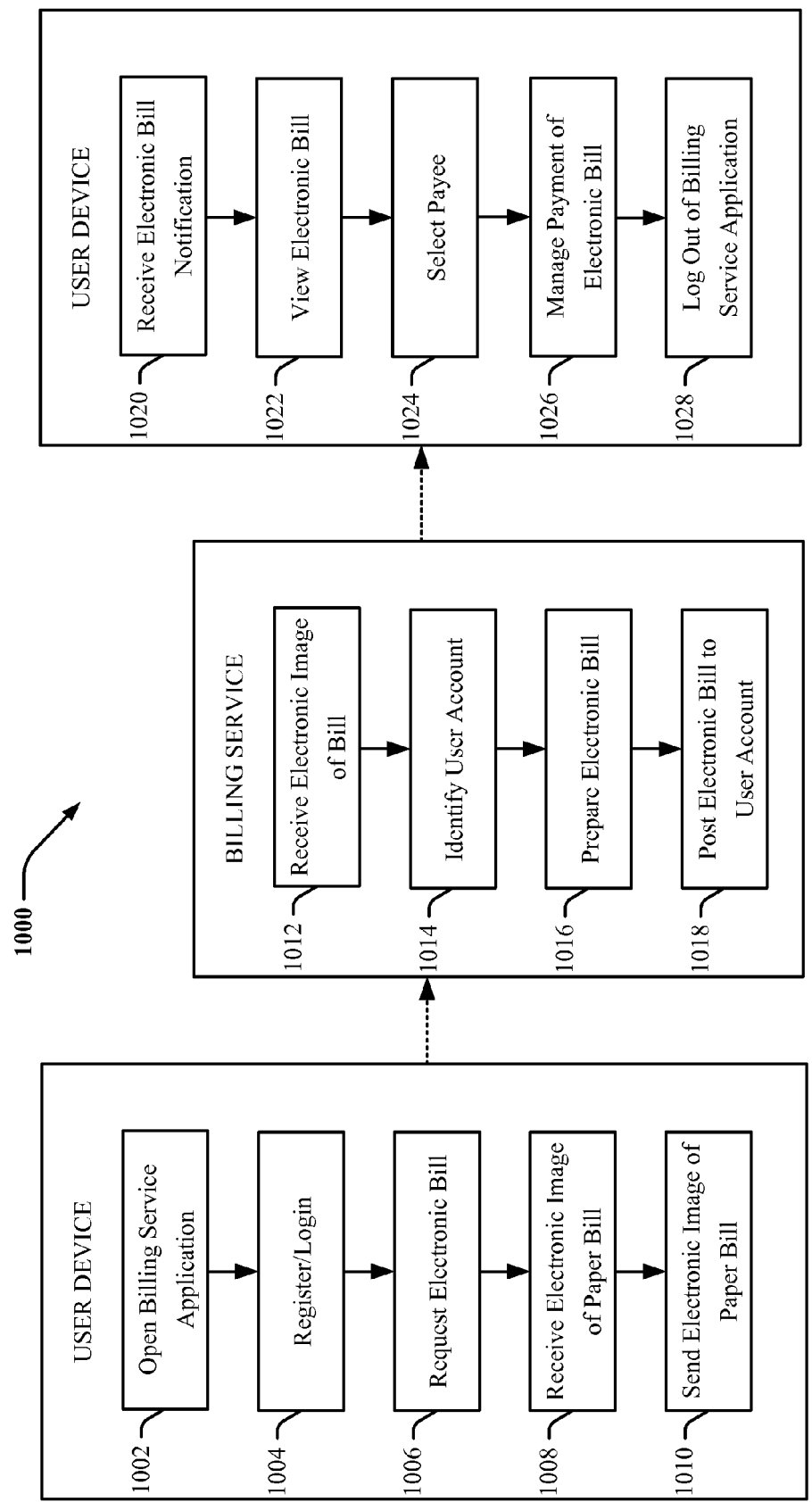
FIG. 10 presents a flow chart of a processes processing payment of a paper invoice in accordance to an embodiment.

FIG. 10 presents a flow chart of a processes 1000 processing payment of a paper invoice in accordance with an embodiment. In particular, process 1000 demonstrates cooperating processes at both the user device and the billing service. Beginning with the user device at 1002 a user can open up billing service application at her user device. For example, the user can have previously installed billing service application at her user device. At 1004, the user can register with the billing service if not previously registered. For example, the user can develop a profile consisting of a user name and password and basic information regarding the user. If the user has already established a profile, the user can merely enter her user name and password at step 1004. Still in yet another aspect, a user and authorize automatic login when opening the billing service application at a known device in subsequent sessions. According, to process 1000, we can assume a user has previously registered with billing service and established a profile. The profile can associate a plurality of accounts for the user including banking, credit, and creditor accounts for the user.

At 1006, the user can then request an electronic bill. For example, a user can request an electronic bill when a user merely has a paper form of a bill. Be requesting an electronic bill at 1006, the user can initiate processing of the paper bill in an electronic manner. At 1008, an electronic image of the paper bill is received in response to the request. For example, when a user requests an electronic bill, the user can be prompted with a notification to supply an image of the paper bill. The user must then provide an image of the paper bill. In an aspect, the user can employ her user device to take a picture of the paper bill and then upload the picture. In another aspect, the user can receive a picture at her device as an attachment to an email or an MMS message. In another aspect, the user can receive an image of paper bill via a scanner associated with her device. Once an image of a bill has been received, at 1010, the user can send the electronic image of the paper bill to the billing service for processing.

At 1012, the billing service receives the electronic bill image. At 1016, the billing service identifies a user account/profile. In an aspect, the billing service can identify a user account by the phone number, email address, or IP address associated with the transmission of the bill image. At 1014, the billing service prepares an electronic form of the bill. For example, the billing service can convert aspects of the bill image into an electronic form. The conversion can include recognition of necessary fields such as total amount owed and due date. In another aspect, the conversion can identify a plurality of fields including item price, total price, addresses, dates, account numbers etc. The billing service then employs the recognized information to prepare an electronic form of the bill. Still in yet another aspect, preparation of an electronic form of the bill merely includes associating the image of the bill with a user storing the electronic information. At 1018, the electronic form of the bill is posted to the user's account. According to this aspect, a user does not need to keep the paper records of the paper bill. On the contrary, the user is provided with an electronic record of the bill and account information associated with the bill. The electronic record can further be stored by the billing service and or by the user device.

Returning to the user device at 1020, the user device is configured to receive a notification regarding processing of the image of the paper bill as an electronic bill. For example, when the user is logged on to the billing service, the user can receive a visual or audible indication noting that payment was processed. Still, in an aspect where the user is not logged on, the user can receive a visual or audible indication noting that payment was processed. The logged on user can then view the electronic records of the bill represented by the image of the bill at 1022. In an aspect, the electronic records include organized generated information regarding the user's account with the payee. For example, the electronic bill can provide a user with all functionality required to pay the bill online. In an aspect, the electronic form of the bill includes fields such as payee, amount owed, date and etc. The electronic form of the bill can further associate the user banking account with the account to which money is to be transferred to a payee. In an aspect, account information for either or both entities can be disguised.

In an aspect where the payee cannot be recognized at conversion of the bill or the electronic image of the bill is merely posted to the user's account, at 1024, the user can select the payee. Selection of a payee can be accomplished in several ways. In an aspect, a user can manually enter the name and account information of the payee provided on the paper form of the bill. In another aspect, the user can simply employ a preconfigured list of payees associated with a user profile. For example, the user can establish a profile comprising a list of payees and information related to processing payments to the payees. The information can include the payee account number, the user account number from which to transfer funds out of, and at least some identifier linking the user to the payee. Still in yet another aspect, a user can select a payee that is not previously associated with a user profile. In an aspect a user can search for registered payees an employ information previously provided to billing service and stored in a database. In another aspect, a user can search for unregistered payees and attempt to receive account information for processing of payment for the unregistered selected payees. According to this aspect, if a user selects an unregistered payee, the user can authorize a payment to the payee, however whether or not the payment is processed dependent upon billing service to later determine the payee account information.

Following selection of the payee, the user can manage electronic payment of the bill at 1026. For example, the user can choose to pay the bill and thus authorize a transaction or transfer of funds to the payee. The user can schedule routine payments, modify payment amounts, modify user account information, modify payee account information, and etc. Finally, at 1028, the user can log out of the billing service application at her device. It should be appreciated that at any time during process 1000, a user can log out and log back in to continue process 1000 where it was left at the time of logging out.

Figure 11:
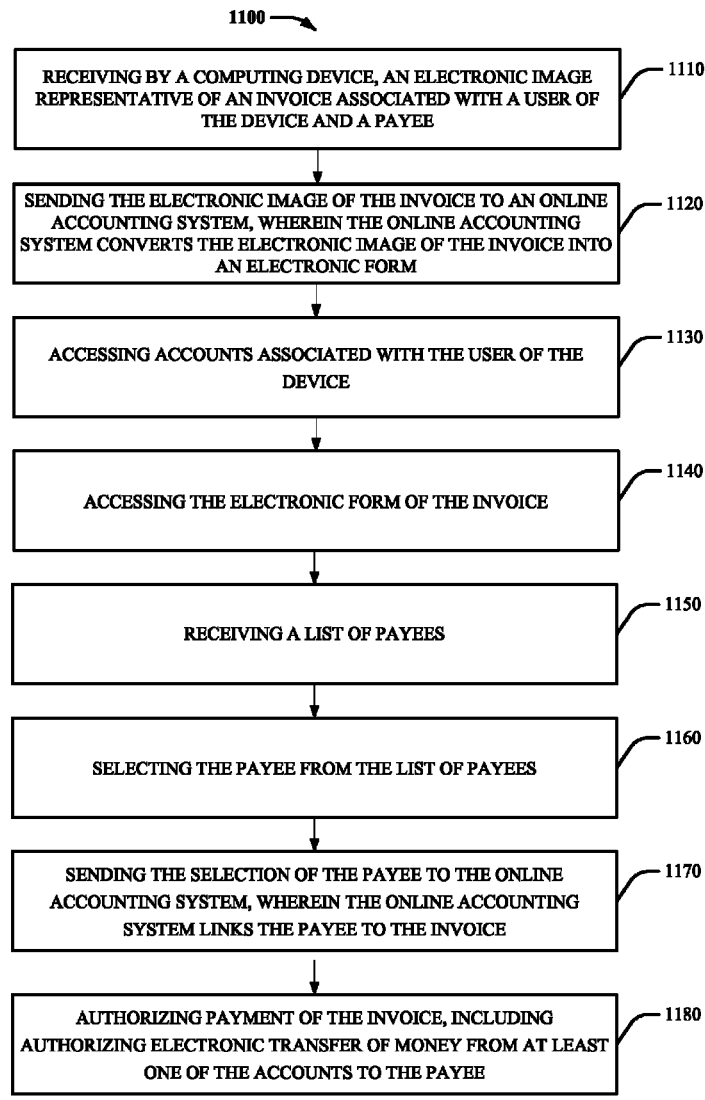
FIG. 11 presents a method for processing a paper bill in an electronic form at a user device in accordance with an embodiment.

FIG. 11 presents a method 1100 for processing a paper bill in an electronic form at a user device in accordance with an embodiment. At 1110 an electronic image representative of an invoice associated with a user of a computing device and a payee is received at a computing device. For example, the computing device can include a cellular phone with a camera. A user can use the camera to take a picture of a paper invoice and upload the picture to a billing/accounting service application. At 1120, the electronic image of the invoice is sent to the online accounting system, wherein the online accounting system converts the electronic image of the invoice into an electronic form. At 1130, accounts associated with the user of the device are accessed. For example, the user can view her accounts by using the online accounting system application on her device. In addition, at 1140, the electronic form of the invoice is accessed. Then at 1150 a list of payees is received. For example, a user can access a list of payees generated through a searching mechanism, or view a list of payees from a drop down menu. At 1160, the user can select a payee from the list of payees. For example, the user can select the payee that is pictured on the electronic image of the invoice or for whom the paper invoice is associated. At 1170, the user can send the selection of the payee to an online accounting system wherein the online accounting system links the payee to the invoice. Lastly, at 1180, payment of the invoice is authorized, including authorizing electronic transfer of money from at least one of the accounts to the payee.

Figure 12:
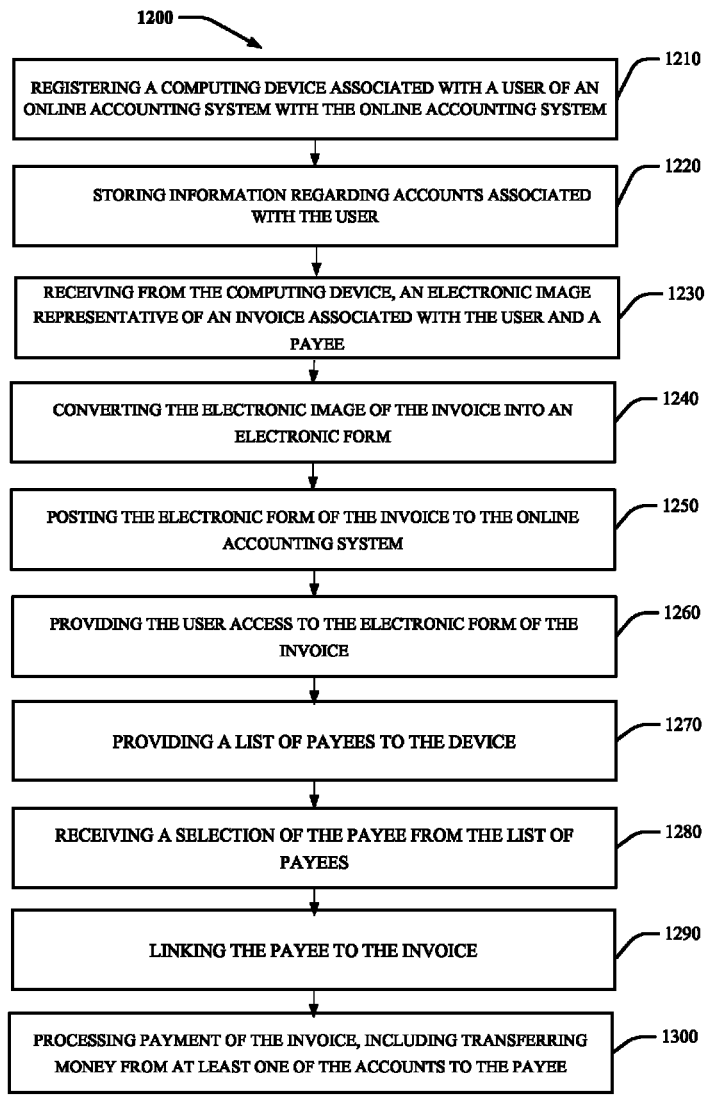
FIG. 12 presents a method for processing a paper bill in an electronic form at a billing service/server in accordance with an embodiment.

FIG. 12 presents a method 1200 for processing a paper bill in an electronic form at a server/billing service in accordance with an embodiment. At 1210 a computing device associated with a user of an online accounting system is registered with the online accounting system. At 1220, information regarding accounts associated with the user is stored. For example, the accounting server/service can store a plurality of banking accounts, credit accounts and creditor accounts for a user. The information can include account numbers, account balances, and account activity. At 1230, an electronic image representative of an invoice associated with the user and a payee is received from the computing device. At 1240, the electronic image of the invoice is converted into an electronic form. At 1250, the electronic form of the invoice is posted to the online accounting system. At 1260, the user is provided access to the electronic form of the invoice.

At 1270, a list of payees is provided to the device. For example, the device can view a dropdown list of possible payees to select for processing of a transaction associated with paying the invoice. At 1280, the selection of a payee is from the list is received. 1290, the online accounting system links the payee to the invoice. For example, the online accounting system can determine the sender of the payee information and link the payee information to the senders account. Lastly, at 1300, payment of the invoice is processed, including transferring money from at least one of the accounts to the payee. For example payment of the invoice can be processed in response to a request by the user/user device.

Figure 13:
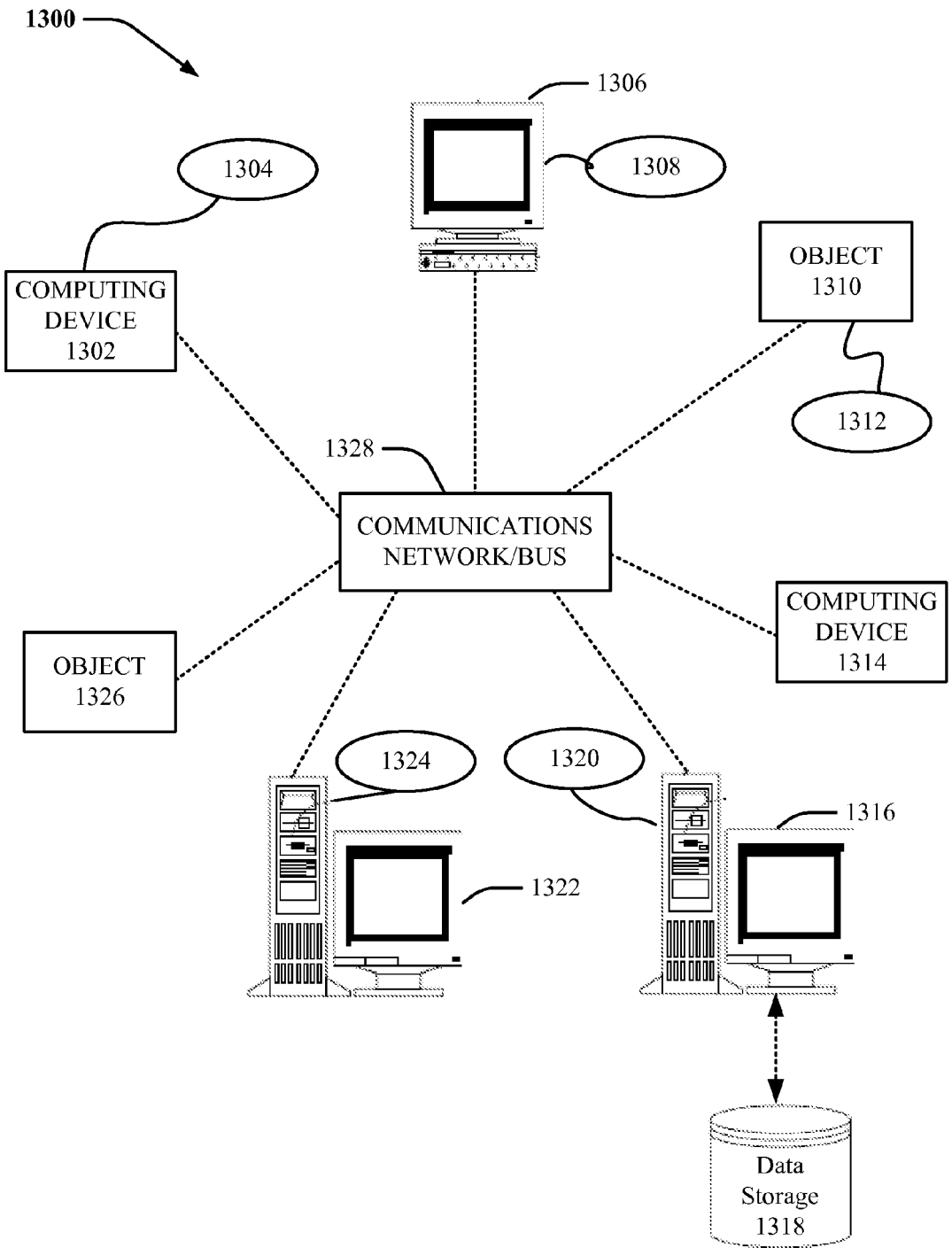
FIG. 13 illustrates a block diagram representing exemplary non-limiting networked environments in which various non-limiting embodiments described herein can be implemented.

FIG. 13 provides a schematic diagram of an exemplary networked or distributed computing environment. The distributed computing environment comprises computing objects 1322, 1316, etc. and computing objects or devices 1302, 1306, 1310, 2026, 1314, etc., which may include programs, methods, data stores, programmable logic, etc., as represented by applications 1304, 1308, 1312, 1324, 1320. It can be appreciated that computing objects 1322, 1316, etc. and computing objects or devices 1302, 1306, 1310, 2026, 1314, etc. may comprise different devices, such as personal digital assistants (PDAs), audio/video devices, mobile phones, MP3 players, personal computers, laptops, etc.

Each computing object 1322, 1316, etc. and computing objects or devices 1302, 1306, 1310, 2026, 1314, etc. can communicate with one or more other computing objects 1322, 1316, etc. and computing objects or devices 1302, 1306, 1310, 1326, 1314, etc. by way of the communications network 1326, either directly or indirectly. Even though illustrated as a single element in FIG. 13, communications network 1326 may comprise other computing objects and computing devices that provide services to the system of FIG. 13, and/or may represent multiple interconnected networks, which are not shown. Each computing object 1322, 1316, etc. or computing object or device 1302, 1306, 1310, 2026, 1314, etc. can also contain an application, such as applications 1304, 1308, 1312, 1324, 1320, that might make use of an API, or other object, software, firmware and/or hardware, suitable for communication with or implementation of the shared shopping systems provided in accordance with various non-limiting embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the shared shopping systems as described in various non-limiting embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In client/server architecture, particularly a networked system, a client is usually a computer that accesses shared network resources provided by another computer, e.g., a server. In the illustration of FIG. 13, as a non-limiting example, computing objects or devices 1302, 1306, 1310, 2026, 1314, etc. can be thought of as clients and computing objects 1322, 1316, etc. can be thought of as servers where computing objects 1322, 1316, etc., acting as servers provide data services, such as receiving data from client computing objects or devices 1302, 1306, 1310, 2026, 1314, etc., storing of data, processing of data, transmitting data to client computing objects or devices 1302, 1306, 1310, 1326, 1314, etc., although any computer can be considered a client, a server, or both, depending on the circumstances. Any of these computing devices may be processing data, or requesting services or tasks that may implicate the shared shopping techniques as described herein for one or more non-limiting embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1326 or bus is the Internet, for example, the computing objects 1322, 1316, etc. can be Web servers with which other computing objects or devices 1302, 1306, 1310, 2026, 1314, etc. communicate via any of a number of known protocols, such as the hypertext transfer protocol (HTTP). Computing objects 1322, 1316, etc. acting as servers may also serve as clients, e.g., computing objects or devices 1302, 1306, 1310, 2026, 1314, etc., as may be characteristic of a distributed computing environment.

As mentioned, advantageously, the techniques described herein can be applied to any device where it is desirable to facilitate shared shopping. It is to be understood, therefore, that handheld, portable and other computing devices and computing objects of all kinds are contemplated for use in connection with the various non-limiting embodiments, i.e., anywhere that a device may wish to engage in a shopping experience on behalf of a user or set of users. Accordingly, the below general purpose remote computer described below in FIG. 26 is but one example of a computing device.

Although not required, non-limiting embodiments can partly be implemented via an operating system, for use by a developer of services for a device or object, and/or included within application software that operates to perform one or more functional aspects of the various non-limiting embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 14:
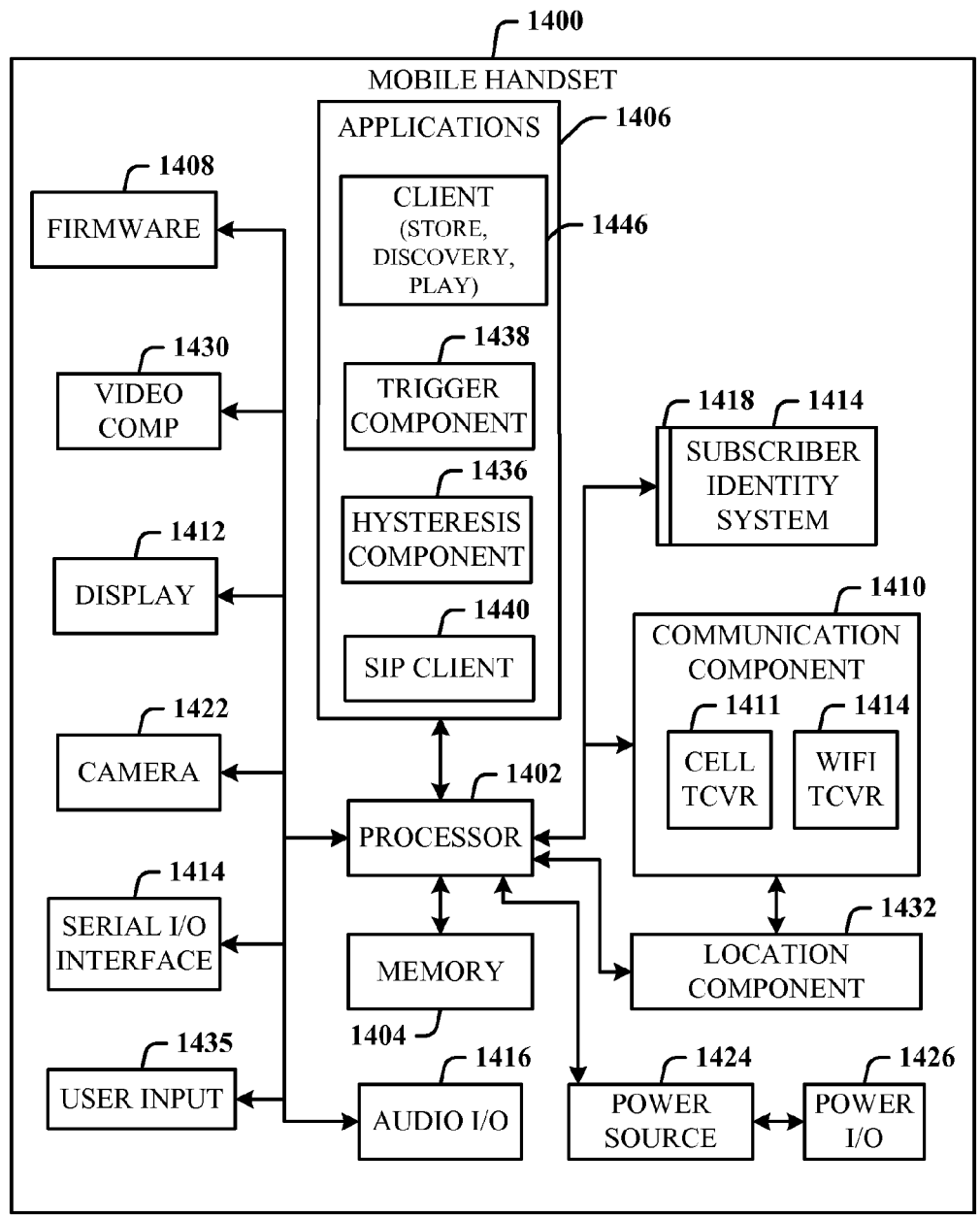
FIG. 14 illustrates a block diagram representing an exemplary non-limiting computing user computing device in which one or more aspects of various non-limiting embodiments described herein can be implemented.

FIG. 14 illustrates a schematic block diagram of an exemplary device 1400 capable of employing the subject system in accordance with some embodiments of the invention. The device is a mobile handset 1400 In order to provide additional context for various aspects thereof, FIG. 14 and the following discussion are intended to provide a brief, general description of a suitable environment 1400 in which the various aspects can be implemented. While the description includes a general context of computer-executable instructions, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the inventive methods can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1400 includes a processor 1402 for controlling and processing all onboard operations and functions. A memory 1404 interfaces to the processor 1402 for storage of data and one or more applications 1406 (e.g., a video player software, user feedback component software, . . . ). Other applications can include voice recognition of predetermined voice commands that facilitate initiation of the user feedback signals. The applications 1406 can be stored in the memory 1404 and/or in a firmware 1408, and executed by the processor 1402 from either or both the memory 1404 or/and the firmware 1408. The firmware 1408 can also store startup code for execution in initializing the handset 1400. A communications component 1410 interfaces to the processor 1402 to facilitate wired/wireless communication with external systems, e.g., cellular networks, VoIP networks, and so on. Here, the communications component 1410 can also include a suitable cellular transceiver 1411 (e.g., a GSM transceiver) and an unlicensed transceiver 1413 (e.g., WiFi, WiMax) for corresponding signal communications. The handset 1400 can be a device such as a cellular telephone, a PDA with mobile communications capabilities, and messaging-centric devices. The communications component 1410 also facilitates communications reception from terrestrial radio networks (e.g., broadcast), digital satellite radio networks, and Internet-based radio services networks.

The handset 1400 includes a display 1412 for displaying text, images, video, telephony functions (e.g., a Caller ID function), setup functions, and for user input. The display 1412 can also accommodate the presentation of multimedia content (e.g., music metadata, messages, wallpaper, graphics, . . . ). A serial I/O interface 1414 is provided in communication with the processor 1402 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1400, for example. Audio capabilities are provided with an audio I/O component 1416, which can include a speaker for the output of audio signals related to, for example, indication that the user pressed the proper key or key combination to initiate the user feedback signal. The audio I/O component 1416 also facilitates the input of audio signals through a microphone to record data and/or telephony voice data, and for inputting voice signals for telephone conversations.

The handset 1400 can include a slot interface 1418 for accommodating a SIC (Subscriber Identity Component) in the form factor of a card Subscriber Identity Module (SIM) or universal SIM 1414, and interfacing the SIM card 1414 with the processor 1402. However, it is to be appreciated that the SIM card 914 can be manufactured into the handset 1400, and updated by downloading data and software thereinto.

The handset 1400 can process IP data traffic through the communication component 1410 to accommodate IP traffic from an IP network such as, for example, the Internet, a corporate intranet, a home network, a person area network, etc., through an ISP or broadband cable provider. Thus, VoIP traffic can be utilized by the handset 1400 and IP-based multimedia content can be received in either an encoded or decoded format.

A video processing component 1414 (e.g., a camera) can be provided for decoding encoded multimedia content. The handset 1400 also includes a power source 1424 in the form of batteries and/or an AC power subsystem, which power source 1424 can interface to an external power system or charging equipment (not shown) by a power I/O component 1426.

The handset 1400 can also include a video component 1430 for processing video content received and, for recording and transmitting video content. A location tracking component 932 facilitates geographically locating the handset 1400. As described hereinabove, this can occur when the user initiates the feedback signal automatically or manually. A user input component 1434 facilitates the user initiating the quality feedback signal. The input component can include such conventional input device technologies such as a keypad, keyboard, mouse, stylus pen, and touch screen, for example.

Referring again to the applications 1406, a hysteresis component 1436 facilitates the analysis and processing of hysteresis data, which is utilized to determine when to associate with the access point. A software trigger component 1438 can be provided that facilitates triggering of the hysteresis component 1438 when the WiFi transceiver 1413 detects the beacon of the access point. A SIP client 940 enables the handset 1400 to support SIP protocols and register the subscriber with the SIP registrar server. The applications 1406 can also include a client 1442 that provides at least the capability of discovery, play and store of multimedia content, for example, music.

The handset 1400, as indicated above related to the communications component 910, includes an indoor network radio transceiver 1413 (e.g., WiFi transceiver). This function supports the indoor radio link, such as IEEE 802.11, for the dual-mode GSM handset 1400. The handset 1400 can accommodate at least satellite radio services through a handset that can combine wireless voice and digital radio chipsets into a single handheld device.

Figure 15:
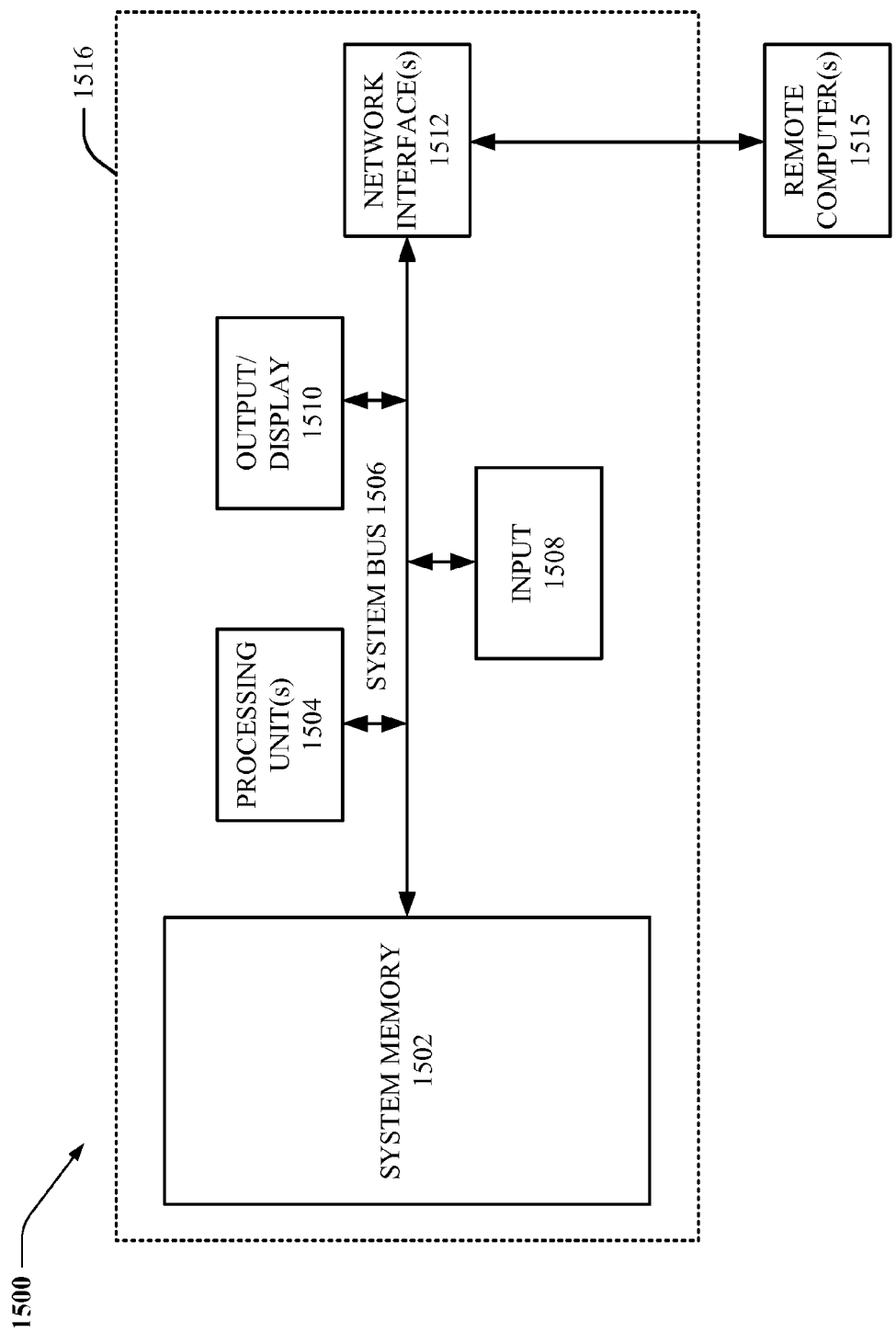
FIG. 15 illustrates a block diagram representing an exemplary non-limiting computing system or operating environment in which one or more aspects of various non-limiting embodiments described herein can be implemented.

With reference to now FIG. 15, an exemplary remote device for implementing one or more non-limiting embodiments includes a general purpose computing device in the form of a computer 1516. Components of computer 1516 may include, but are not limited to, a processing unit 1504, a system memory 1502, and a system bus 1506 that couples various system components including the system memory to the processing unit 1504.

Computer 1516 typically includes a variety of computer readable media and can be any available media that can be accessed by computer 1516. The system memory 1502 may include computer storage media in the form of volatile and/or nonvolatile memory such as read only memory (ROM) and/or random access memory (RAM). Computer readable media can also include, but is not limited to, magnetic storage devices (e.g., hard disk, floppy disk, magnetic strip), optical disks (e.g., compact disk (CD), digital versatile disk (DVD)), smart cards, and/or flash memory devices (e.g., card, stick, key drive). By way of example, and not limitation, system memory 1502 may also include an operating system, application programs, other program modules, and program data.

A user can enter commands and information into the computer 1516 through input devices 1508. A monitor or other type of display device is also connected to the system bus 1506 via an interface, such as output interface 1512. In addition to a monitor, computers can also include other peripheral output devices such as speakers and a printer, which may be connected through output interface 1512.

The computer 1516 may operate in a networked or distributed environment using logical connections to one or more other remote computers, such as remote computer 1512. The remote computer 1512 may be a personal computer, a server, a router, a network PC, a peer device or other common network node, or any other remote media consumption or transmission device, and may include any or all of the elements described above relative to the computer 1516. The logical connections depicted in FIG. 15 include a network, such local area network (LAN) or a wide area network (WAN), but may also include other networks/buses. Such networking environments are commonplace in homes, offices, enterprise-wide computer networks, intranets and the Internet.

As mentioned above, while exemplary non-limiting embodiments have been described in connection with various computing devices and network architectures, the underlying concepts may be applied to any network system and any computing device or system.

Also, there are multiple ways to implement the same or similar functionality, e.g., an appropriate application programming interface (API), tool kit, driver source code, operating system, control, standalone or downloadable software object, etc. which enables applications and services to take advantage of techniques provided herein. Thus, non-limiting embodiments herein are contemplated from the standpoint of an API (or other software object), as well as from a software or hardware object that implements one or more aspects of the shared shopping techniques described herein. Thus, various non-limiting embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described infra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various non-limiting embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

As discussed herein, the various embodiments disclosed herein may involve a number of functions to be performed by a computer processor, such as a microprocessor. The microprocessor may be a specialized or dedicated microprocessor that is configured to perform particular tasks according to one or more embodiments, by executing machine-readable software code that defines the particular tasks embodied by one or more embodiments. The microprocessor may also be configured to operate and communicate with other devices such as direct memory access modules, memory storage devices, Internet-related hardware, and other devices that relate to the transmission of data in accordance with one or more embodiments. The software code may be configured using software formats such as Java, C++, XML (Extensible Mark-up Language) and other languages that may be used to define functions that relate to operations of devices required to carry out the functional operations related to one or more embodiments. The code may be written in different forms and styles, many of which are known to those skilled in the art. Different code formats, code configurations, styles and forms of software programs and other means of configuring code to define the operations of a microprocessor will not depart from the spirit and scope of the various embodiments.

Within the different types of devices, such as laptop or desktop computers, hand held devices with processors or processing logic, and also possibly computer servers or other devices that utilize one or more embodiments, there exist different types of memory devices for storing and retrieving information while performing functions according to the various embodiments. Cache memory devices are often included in such computers for use by the central processing unit as a convenient storage location for information that is frequently stored and retrieved. Similarly, a persistent memory is also frequently used with such computers for maintaining information that is frequently retrieved by the central processing unit, but that is not often altered within the persistent memory, unlike the cache memory. Main memory is also usually included for storing and retrieving larger amounts of information such as data and software applications configured to perform functions according to one or more embodiments when executed, or in response to execution, by the central processing unit. These memory devices may be configured as random access memory (RAM), static random access memory (SRAM), dynamic random access memory (DRAM), flash memory, and other memory storage devices that may be accessed by a central processing unit to store and retrieve information. During data storage and retrieval operations, these memory devices are transformed to have different states, such as different electrical charges, different magnetic polarity, and the like. Thus, systems and methods configured according to one or more embodiments as described herein enable the physical transformation of these memory devices. Accordingly, one or more embodiments as described herein are directed to novel and useful systems and methods that, in the various embodiments, are able to transform the memory device into a different state when storing information. The various embodiments are not limited to any particular type of memory device, or any commonly used protocol for storing and retrieving information to and from these memory devices, respectively.

Embodiments of the systems and methods described herein facilitate the management of data input/output operations. Additionally, some embodiments may be used in conjunction with one or more conventional data management systems and methods, or conventional virtualized systems. For example, one embodiment may be used as an improvement of existing data management systems.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

Although some specific embodiments have been described and illustrated as part of the disclosure of one or more embodiments herein, such embodiments are not to be limited to the specific forms or arrangements of parts so described and illustrated. The scope of the various embodiments are to be defined by the claims appended hereto and their equivalents.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other. As used herein, unless explicitly or implicitly indicating otherwise, the term "set" is defined as a non-zero set. Thus, for instance, "a set of criteria" can include one criterion, or many criteria.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a memory that stores computer-executable components; and
a processor that executes or facilitates execution of the computer executable components, comprising:
a registration component configured to register a device associated with a user identity with an online accounting system and establish a user account for the user identity with the online accounting system;
an invoice image component configured to receive from the device, an electronic image representative of a paper invoice associated with the user identity and a payee identity;
a communication component configured to send the electronic image to the online accounting system over a network, wherein the online accounting system is configured to convert the electronic image into an electronic form of the invoice and associate the electronic form of the invoice with the user account; and
an account management component configured to interface with the online accounting system over the network and enable access to the electronic form of the invoice.

2. The system of claim 1, wherein the computer executable components further comprise a payee component configured to provide a list of payee identities to the device, receive a selection of the payee identity from the list of payee identities, and link the payee identity to the invoice.

3. The system of claim 2, wherein the payee component is further configured determine information including at least one of a deposit account associated with the payee identity, or an affiliation of the user identity with the payee identity and link the information to the invoice.

4. The system of claim 2, wherein the payee component is further configured to conduct a search query based on a received key term to generate the list of payee identities.

5. The system of claim 2, wherein the payee component is further configured to link the payee identity to the invoice prior to sending of the electronic image to the online accounting system.

6. The system of claim 5, wherein the computer executable components further comprise an authorization component configured to authorize payment of the invoice by the user identity to the payee identity in response to sending of the electronic image to the online accounting system.

7. The system of claim 2, wherein the payee component is further configured to link the payee identity to the invoice after the electronic form of the invoice is associated with the user account at the online accounting system.

8. The system of claim 1, wherein the computer executable components further comprise a transaction component configured to facilitate electronic payment of the invoice for the user identity via the user account at the online accounting system.

9. The system of claim 1, wherein the electronic image representative of the invoice is captured by a camera on the device.

10. The system of claim 1, wherein the account management component is further configured to send a notification to the device when the electronic form of the invoice has been associated with the user account at the online accounting system.

11. A method comprising:
receiving, by a computing device comprising a processor, an electronic image representative of an invoice associated with a user of the device and a payee;
sending the electronic image of the invoice to an online accounting system via a network, wherein the online accounting system converts the electronic image of the invoice into an electronic form of the invoice and associates the electronic form of the invoice with a user account associated with the user at the online accounting system;
providing the user access to the user account at the online accounting system via the network; and
presenting the electronic form of the invoice via the user account.

12. The method of claim 11, further comprising:
generating a list of payees;
receiving a selection of the payee from the list of payees; and
sending the selection of the payee to the online accounting system, wherein the online accounting system links the payee to the invoice.

13. The method of claim 12, further comprising:
generating information including at least one of an identity of the payee, a deposit account associated with the payee, or an affiliation of the user with the payee; and
sending the information to the online accounting system, wherein the online accounting system links the information to the invoice.

14. The method of claim 13, wherein the generating the information comprises employing a search engine configured to conduct a search query for the information at one or more external data stores based in part on the selection of the payee.

15. The method of claim 12, wherein the receiving the selection of the payee from the list of payees is performed prior to the sending of the electronic image to the online accounting system.

16. The method of claim 15, further comprising authorizing payment of the invoice by the user to the payee in response to the sending of the electronic image to the online accounting system.

17. The method of claim 12, wherein the receiving the selection of the payee from the list of payees is performed after the accessing the electronic form of the invoice.

18. The method of claim 11, further comprising authorizing payment of the invoice, including authorizing electronic transfer of money from a payment account associated with the user to the payee using the online accounting system.

19. The method of claim 11, further comprising:
generating the electronic image representative of the invoice with a camera on the computing device.

20. The method of claim 11, further comprising:
receiving a notification when the electronic form of the invoice is accessible.

21. A method comprising:
using a processor to execute or facilitate execution of computer executable instructions stored in a memory to perform operations, comprising:
registering a computing device associated with a user identity of an online accounting system with the online accounting system;
establishing a user account for the user identity with the online accounting system;
receiving from the computing device, an electronic image representative of a paper invoice associated with the user identity and a payee identity;
sending the electronic image to the online accounting system via a set of network devices, wherein the online accounting system is configured to convert the electronic image into an electronic form of the invoice and associate the electronic form of the invoice with the user account;
interfacing with the online accounting system over via the set of network devices; and
enabling access to the electronic form of the invoice for the user identity.

22. The method of claim 21, further comprising:
generating a list of payee identities;
providing the list of payee identities to the computing device;
receiving a selection of the payee identity from the list of payee identities; and
linking the payee to the invoice.

23. The method of claim 22, further comprising:
determining information including at least one of a deposit account associated with the payee identity, or an affiliation of the user identity with the payee identity; and
linking the information to the invoice.

24. The method of claim 23, wherein the determining the information includes employing a search engine configured to conduct a search query for the information at one or more external data stores based in part on the selection of the payee identity.

25. The method of claim 22, wherein the receiving the selection of the payee from the list of payee identities is performed prior to the sending of the electronic image to the online accounting system.

26. The method of claim 25, further comprising authorizing payment of the invoice by the user identity to the payee identity in response to the sending of the electronic image to the online accounting system.

27. The method of claim 22, wherein the receiving the selection of the payee from the list of payee identities is performed after the enabling the access to the electronic form of the invoice.

28. The method of claim 21, further comprising authorizing payment of the invoice, including authorizing electronic transfer of money from a payment account associated with the user identity to the payee identity using the online accounting system.

29. The method of claim 21, wherein the electronic image representative of the invoice is captured by a camera on the computing device.

30. The system of claim 21, further comprising:
sending a notification to the device in response to association of the electronic form of the invoice with the user account.

31. A system comprising:
means for receiving an electronic image representative of an invoice associated with a user of the device and a payee;
means for sending the electronic image of the invoice to an online accounting system via a network, wherein the online accounting system converts the electronic image of the invoice into an electronic form of the invoice and associates the electronic form of the invoice with a user account associated with the user at the online accounting system;
means for enabling the user to access the user account via the online accounting system accessible via the network; and
means for presenting the user with the electronic form of the invoice via the user account.

32. The system of claim 31, further comprising:
means for generating a list of payees;
means for receiving selection of the payee from the list of payees; and
means for sending the selection of the payee to the online accounting system,
wherein the online accounting system links the payee to the invoice.

33. The system of claim 32, further comprising:
means for generating information including at least one of an identity of the payee, a deposit account associated with the payee, or an affiliation of the user with the payee; and
means for sending the information to the online accounting system, wherein the online accounting system links the information to the invoice.

34. The system of claim 32, further comprising:
means for wherein the receiving the selection of the payee from the list of payees is performed prior to the sending of the electronic image to the online accounting system.

35. The system of claim 31, further comprising means for authorizing payment of the invoice, including authorizing electronic transfer of money from a payment account associated with the user to the payee using the online accounting system.

36. A computer-readable storage device comprising computer-readable instructions that, in response to execution, cause a computing system to perform operations, comprising:
registering a computing device associated with a user identity of an online accounting system with the online accounting system;
establishing a user account for the user identity with the online accounting system;
receiving from the computing device, an electronic image representative of a paper invoice associated with the user identity and a payee identity;
sending the electronic image to the online accounting system over a network, wherein the online accounting system is configured to convert the electronic image into an electronic form of the invoice and associate the electronic form of the invoice with the user account;
interfacing with the online accounting system over the network; and
providing the user identity access to the electronic form of the invoice.

37. The computer-readable storage device of claim 36, the operations further comprising:
generating a list of payee identities;
providing the list of payee identities to the device;
receiving a selection of the payee identity from the list of payee identities; and
linking the payee identity to the invoice.

38. The computer-readable storage device of claim 37, the operations further comprising:
determining information including at least one of an identity of the payee, a deposit account associated with the payee identity, or an affiliation of the user identity with the payee identity; and
linking the information to the invoice.

39. The computer-readable storage device of claim 37, wherein the receiving the selection of the payee identity from the list of payee identities is performed prior to the sending of the electronic image to the online accounting system.

40. The computer-readable storage device of claim 36, the operations further comprising authorizing payment of the invoice by the user identity to the payee identity in response to the sending of the electronic image to the online accounting system.

41. The system of claim 8, wherein the user account includes information linking the user identity to a payment account and wherein the transaction component is configured to facilitate the electronic payment of the invoice using the payment account.

42. The method of claim 18, wherein the authorizing the payment of the invoice comprises authorizing the payment of the invoice in response to the sending the image of the invoice.

43. The method of claim 28, wherein the authorizing the payment of the invoice comprises authorizing the payment of the invoice in response to the sending the image of the invoice.

44. The system of claim 1, wherein the online accounting system is configured to identify the user identity account based on a phone number associated with the device and wherein the communication component is configured to send the electronic image to the online accounting system using the phone number.

45. The method of claim 11, wherein the online accounting system is configured to identify the user account based on a phone number associated with the device and wherein the sending the electronic image includes sending the electronic image to the online accounting system using the phone number.

46. The method of claim 21, wherein the online accounting system is configured to identify the user account based on a phone number associated with the device and wherein the sending the electronic image includes sending the electronic image to the online accounting system using the phone number.

47. A method comprising:
capturing, by a camera of a computing device, an electronic image of a paper invoice requesting payment to a payee;

sending, by the computing device, the electronic image of the invoice to an online accounting system via a network, wherein the online accounting system converts the electronic image of the invoice into an electronic form of the invoice and associates the electronic form of the invoice with a user account associated with the computing device at the online accounting system;

accessing, by the computing device, the electronic form of the invoice via the user account at the online accounting system;

selecting the payee from a list of payees; and managing electronic payment of the invoice to the payee using the online accounting system the online accounting system.

48. The method of claim 47, further comprising authorizing payment of the invoice to the payee from a payment account associated with the user using the online accounting system.

49. The method of claim 47, further comprising receiving a notification in response to association of the electronic form of the invoice with the user account.

50. The method of claim 47, further comprising:

employing a search engine to find account information for the payee at one or more external data stores; and linking the account information with the payee.

* * * * *